US010993453B2

(12) United States Patent
Coker et al.

(10) Patent No.: US 10,993,453 B2
(45) Date of Patent: May 4, 2021

(54) DAIRY PRODUCT AND PROCESSES

(71) Applicant: Fonterra Co-Operative Group Limited, Auckland (NZ)

(72) Inventors: Christina Puryer Coker, Palmerston North (NZ); Graeme Shawn Gillies, Palmerston North (NZ); Palatasa Havea, Palmerston North (NZ); Stephen Murray Taylor, Palmerston North (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 29 days.

(21) Appl. No.: 16/063,894

(22) PCT Filed: Dec. 23, 2016

(86) PCT No.: PCT/NZ2016/050206
§ 371 (c)(1),
(2) Date: Jun. 19, 2018

(87) PCT Pub. No.: WO2017/111621
PCT Pub. Date: Jun. 29, 2017

(65) Prior Publication Data
US 2018/0368433 A1 Dec. 27, 2018

(30) Foreign Application Priority Data

Dec. 24, 2015 (NZ) .......................................... 715584
Feb. 15, 2016 (NZ) .......................................... 716956

(51) Int. Cl.
A23C 19/068 (2006.01)
A23C 9/142 (2006.01)
A23C 9/146 (2006.01)
A23C 19/05 (2006.01)
A23C 19/064 (2006.01)

(52) U.S. Cl.
CPC .......... *A23C 19/0684* (2013.01); *A23C 9/146* (2013.01); *A23C 9/1422* (2013.01); *A23C 19/05* (2013.01); *A23C 19/051* (2013.01); *A23C 19/053* (2013.01); *A23C 19/064* (2013.01)

(58) Field of Classification Search
CPC ... A23C 19/0684; A23C 9/1422; A23C 9/146; A23C 19/05; A23C 19/051; A23C 19/053; A23C 19/064
USPC .......................... 426/34, 36, 38, 40, 580, 582
See application file for complete search history.

(56) References Cited
U.S. PATENT DOCUMENTS

2003/0054068 A1  3/2003 Dybing et al.

FOREIGN PATENT DOCUMENTS

| AU | 8809482 | 3/1983 |
|----|---------|--------|
| JP | S56-068349 | 6/1981 |
| JP | S63-269944 | 11/1988 |
| JP | H05-137504 | 6/1993 |
| KR | 10-2010-0079677 | 7/2010 |
| NZ | 517293 | 9/2003 |
| WO | WO 1999/021430 | 5/1999 |
| WO | WO 2003/069982 A1 | 8/2003 |
| WO | WO 2007/027926 | 3/2007 |
| WO | WO 2008/131016 | 10/2008 |
| WO | WO 2017/111621 | 6/2017 |

OTHER PUBLICATIONS

European Search Report dated Aug. 19, 2019 in corresponding European Application No. EP16879453; 8 pages.
Awad, R. A. et al, "Modification of buffalo milk casein by protease and calcium chelating agent to enhance the functional properties of mozzarella cheese," Egyptian J. Dairy Sci. (2007) vol. 35, pp. 219-229.
Jana, A. H. et al, "Manufacturing and Quality of Mozzarella Cheese: A Review," Int. J. Dairy Sci. (2011) vol. 6, No. 4, pp. 199-226.
McMahon, D. J. et al, "Influence of fat, moisture and salt on functional properties of mozzarella cheese," Aust. J. Dairy Technol. (1998) vol. 53, pp. 98-101.
International Search Report dated Mar. 17, 2017 in PCT Application No. PCT/NZ2016/050206; 55 pages.
"Information of the food composition of Mozzarella cheese, cow", Banca Dati di Composizione degli Alimenti per Studi Epidemiologici in Italia, 2008—http://www.bda-jeo.it/wordpress/en/?page_id=27.
Hamzah M. Abu-Tarboush, "Prediction of Mozzarella Cheese Yield from Milk Composition", Utah State University, DigitalCommons@USU, 1982.
Guinee et al., "Effect of ripening temperature on low moisture Mozzarella cheese: 2. Texture and functionality", Le Lait, INRA Editions, 2001, vol. 81, No. 4, pp. 475-485—https://hal.archives-ouvertes.fr/hal-00895350.
"Codex Standard for Mozzarella", CODEX STAN 262-2006, https://www.google.com/url?sa=t&rct=j&q=&esrc=s&source=web&cd=&ved=2ahUKEwjhgdyZo6XrAhUM2qwKHar8DIUQFjAAegQI-BBAB&url=http%3A%2F%2Fwww.fao.org%2Finput%2Fdownload%2Fstandards%2F10749%2FCXS_262e.pdf&usg=AOvVaw1BgglQmCcoIsC-udR4vPRZ.
Hashimoto et al., "3.2 Mozzarella cheese, 4.2 primary functionality", Modern cheese science, Japan, Food Material Research Society, 2008, 1st print of the 1st edition, p. 153-169, 291-310.

(Continued)

Primary Examiner — Leslie A Wong
(74) Attorney, Agent, or Firm — Knobbe Martens Olson & Bear, LLP

(57) ABSTRACT

The invention relates to the manufacture of a pasta filata cheese comprising a moisture content of at least about 55% by weight, a solids-non-fat content of up to about 45% by weight, the solids-non-fat comprising at least about 70% by weight protein, the protein comprising at least about 65% by weight casein, and a mineral content comprising a total divalent cation content of about 25 to about 75 mMol of divalent cations/100 g casein, and a total monovalent cation content of about 100 to about 250 mMol monovalent cations/100 g casein, and a total cation content of about 150 to about 300 mMol total cations/100 g casein.

25 Claims, 1 Drawing Sheet

(56) References Cited

OTHER PUBLICATIONS

Hashimoto et al., "3.2 Mozzarella cheese, 4.2 primary functionality", Modern cheese science, Japan, Food Material Research Society, 2008, 1st print of the 1st edition, Human translation of Table 1 of p. 291, Table 4 of p. 295, Table 3 of p. 166 and lines 7-8 of p. 292.

Hashimoto et al., "3.2 Mozzarella cheese, 4.2 primary functionality", Modern cheese science, Japan, Food Material Research Society, 2008, 1st print of the 1st edition, Human translation of p. 155 to the top of p. 168 (note, Figures 1, 2 and 3 in this document have been taken from the machine translation document).

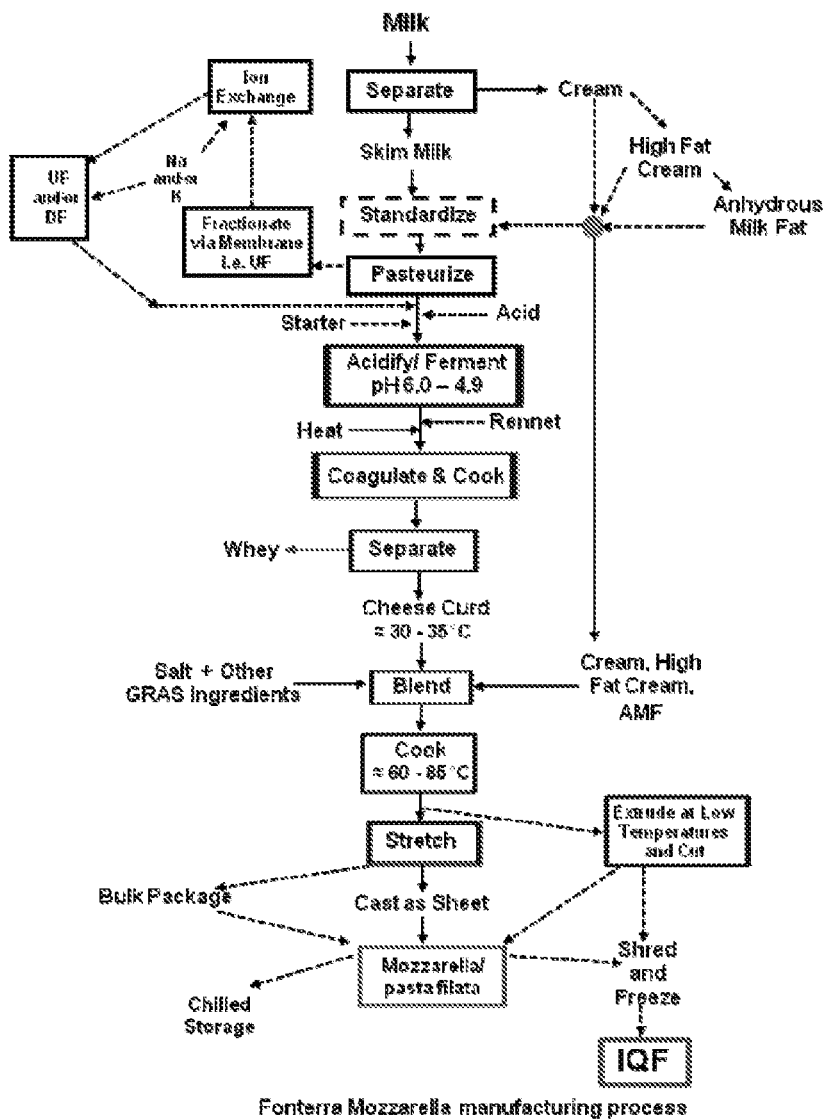
Fonterra Mozzarella manufacturing process

DAIRY PRODUCT AND PROCESSES

This application is a 371 of PCT/NZ2016/050206, filed Dec. 23, 2016.

FIELD OF THE INVENTION

The present invention relates to pasta filata cheeses and method of manufacture, particularly pasta filata cheeses such as mozzarella comprising a high moisture content.

BACKGROUND TO THE INVENTION

Mozzarella and pasta filata cheeses are widely used in many food and food service applications, such as being baked on pizzas. These applications particularly favour mozzarella shredded to produce small particles, that then are frozen to become "individually quick frozen" (IQF) cheeses.

Traditional mozzarella and pasta filata cheeses may be currently produced to high moisture contents, particularly when made with buffalo milk. However, such cheeses shred or grate very poorly. The inability to shred properly prevents the manufacture of suitable pizza cheese with high moisture contents, or moisture contents significantly exceeding 55%.

Traditionally made mozzarella and pasta filata cheeses also require an initial aging period lasting at least several weeks before developing the desired functionality in baked foods, such as pizza. Some of these functional properties include providing the desired melting properties, stretch, colour when molten and then while cooling, tenderness while chewing, blister formation, fat release, moisture release (syneresis) and loss by evaporation or (eliminating or limiting) soaking into the pizza crust. Once aging produces the desired functional characteristics, traditional mozzarella and pasta filata cheeses then rapidly lose these characteristics with additional aging. Therefore, the useful lifespan of fully functional mozzarella and pasta filata cheese for baking applications is quite short.

It is an object of the present invention to provide an improved or alternative pasta filata cheese.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

A pasta filata cheese comprising a moisture content of at least about 55% by weight, a solids-non-fat content of up to about 45% by weight, the solids-non-fat comprising at least about 70% by weight protein, the protein comprising at least about 65% by weight casein, and a mineral content comprising
  a total divalent cation content of about 25 to about 75 mMol of divalent cations/100 g casein, or a total divalent cation content of about 50 to about 150 meq divalent cations/100 g casein, and
  a total monovalent cation content of about 100 to about 250 mMol monovalent cations/100 g casein, or a total monovalent cation content of about 100 to about 250 meq monovalent cations/100 g casein, and
  a total cation content of about 150 to about 300 mMol total cations/100 g casein.

A pasta filata cheese comprising a moisture content of at least about 55% by weight, a solids-non-fat content of up to about 45% by weight, the solids-non-fat comprising at least about 70% by weight protein, the protein comprising at least about 65% by weight casein, and a mineral content comprising
  less than about 2840 mg calcium/100 g casein, or less than about 70 mMol calcium/100 g casein, or less than about 140 meq calcium/100 g casein, and
  less than about 145 mg magnesium/100 g casein, or less than about 6.0 mMol magnesium/100 g casein, or less than 12.0 meq magnesium/100 g casein,
  less than about 16.5 µg manganese/100 g casein, less than about 0.3 µmMol manganese/100 g casein, and/or less than about 0.00006 meq manganese/100 g casein,
  less than about 13 mg zinc/100 g casein, less than 0.2 µMol zinc/100 g casein, and/or less than 0.0004 meq zinc/100 g casein,
  less than about 4.5 g sodium/100 g casein, less than about 195 mMol sodium/100 g casein, and/or less than about 195 meq sodium/100 g casein,
  less than about 0.2 g potassium/100 g casein, less than about 5.0 mMol potassium/100 g casein, and/or less than about 5.0 meq potassium/100 g casein, and
  less than about 4 g phosphate/100 g casein, or less than 795 mMol phosphate/100 g casein.

In a further aspect the invention relates to a process for making a pasta filata cheese comprising
a) providing a source of milk protein comprising
  i) at least 65 to 99% by weight casein, and
  ii) a total divalent cation content of about 25 to about 75 mMol of divalent cations/100 g casein, or a total divalent cation content of about 50 to about 150 meq divalent cations/100 g casein, and
  iii) a total monovalent cation content of about 100 to about 250 mMol monovalent cations/100 g casein, or a total monovalent cation content of about 100 to about 250 meq monovalent cations/100 g casein, and
  iv) a total cation content of about 150 to about 300 mMol total cations/100 g casein, and
  v) a pH of from about 4.9 to about 6,
b) contacting the source of milk protein with a coagulating agent at a temperature of 8 to 50° C. to produce a milk curd,
c) mixing at least one lipid ingredient and the curd to produce a mixture,
d) heating and mechanically working the mixture at a temperature from about 65 to about 90° C. to produce a heated cheese mass, and
e) processing the heated cheese mass to form a pasta filata cheese product.

In a further aspect the invention relates to a process for making a pasta filata cheese comprising
a) providing a source of milk protein comprising
  i) at least about 65 to 99% by weight casein, and
  ii) a total divalent cation content of about 25 to about 75 mMol of divalent cations/100 g casein, or a total divalent cation content of about 50 to about 150 meq divalent cations/100 g casein, and
  iii) a pH of from about 4.9 to about 6,
b) contacting the source of milk protein with a coagulating agent at a temperature of 8 to 50° C. to produce a milk curd, c) mixing at least one lipid ingredient and the curd to produce a mixture and adjusting the monovalent cation content to obtain
  i) a total monovalent cation content of about 100 to about 250 mMol monovalent cations/100 g casein, or a total monovalent cation content of about 100 to about 250 meq monovalent cations/100 g casein, and
  ii) a total cation content of about 150 to about 300 mMol total cations/100 g casein, and
d) heating and mechanically working the mixture at a temperature from about 65 to about 90° C. to produce a heated cheese mass, and
e) processing the heated cheese mass to form a pasta filata cheese product.

In a further aspect the present invention relates to a process for making a pasta filata cheese comprising
a) providing a first pasta filata cheese product produced by the process comprising
  i) providing a source of milk protein comprising at least 65 to 99% by weight casein and a pH of from about 4.9 to about 6,
  ii) contacting the source of milk protein with a coagulating agent at a temperature of 8 to 50° C. to produce a milk curd,
  iii) mixing at least one lipid ingredient to the curd to produce a mixture,
  iv) heating and mechanically working the mixture at a temperature from about 65 to about 90° C. to produce a heated cheese mass, and
  v) processing the heated cheese mass to form a first pasta filata cheese product;
b) determining the monovalent and the divalent cation content of the first pasta filata cheese product,
c) preparing a second pasta filata cheese product by a process comprising
  i) providing a source of milk protein comprising at least 65 to 99% by weight casein and a pH of from about 4.9 to about 6,
  ii) contacting the source of milk protein with a coagulating agent at a temperature of 8 to 50° C. to produce a milk curd,
  iii) mixing at least one lipid ingredient to the curd to produce a mixture,
  iv) heating and mechanically working the mixture at a temperature from about 65 to about 90° C. to produce a heated cheese mass, and
  v) processing the heated cheese mass to form a first pasta filata cheese product;
d) adjusting the monovalent cation content of the curd, the mixture, the cheese mass, or a combination thereof, based on the measurement of the first pasta filata to produce a pasta filata cheese product having
  i) a total divalent cation content of about 25 to about 75 mMol of divalent cations/100 g casein, and
  ii) a total monovalent cation content of about 100 to about 250 mMol monovalent cations/100 g casein, and
  iii) a total cation content of about 150 to about 300 mMol total cations/100 g casein.

The following embodiments may relate to any of the above aspects.

In one embodiment the milk protein is pasteurised.

In one embodiment the pasta filata cheese comprises up to about 75 mMol/100 g casein of total monovalent cations comprising about 2.5 to about 72.5 mMol sodium ions/100 g casein and about 2.5 to about 35 mMol potassium ions/100 g casein.

In one embodiment the pasta filata cheese comprises up to about 250 mMol/100 g casein of total monovalent cations comprising about 175 to about 247.5 mMol sodium ion/100 g casein and about 2.5 to about 75 mMol potassium ion/100 g casein.

In one embodiment the pasta filata cheese is shredded and applied to a food product. Preferably the food product is a pizza.

In one embodiment, upon use on or in a food product, the cooked pasta filata cheese exhibits the characteristics of:
  i) a blister percentage of less than 35%,
  ii) a maximum blister size score of less than 20 mm,
  iii) a pizza blister Hunter L scale colour value of less than 50,
  iv) a melt value of less than 6 on the (FRDC) modified Schreiber melt test,
  v) a free oil content of less than 20% cheese mass,
  vi) a stretch of less than 50 cm, and
  vii) any combination of two or more of (i) to (vi) above.

In one embodiment the source of milk protein is selected from whole fat milk, whole milk retentate/concentrate, semi skimmed milk, skimmed milk, skimmed retentate/concentrate, butter milk, butter milk retentate/concentrate and whey protein retentate/concentrate; or one or more powders, such as whole milk powder, skimmed milk powder, milk protein concentrate powder, milk protein isolate powder, whey protein concentrate powder, whey protein isolate powder and buttermilk powder or other powders made from milk, reconstituted or dry, singularly or in combination.

In one embodiment the mineral content of the milk protein is altered by filtration, acid addition, and/or mineral sequestration or a combination thereof.

In one embodiment the monovalent content is adjusted through the addition of NaCl or KCl. Preferably NaCl is used.

In some embodiments the monovalent content is adjusted in the curd, the mixture, the cheese mass or a mixture thereof.

In one embodiment the mixture is adjusted to a sodium content of 100, 120, 140, 160, 180, 200, 220, 240 or 250 mMol Na/100 g Casein, and useful ranges may be selected between any of these values.

In one embodiment the adjustment of the cation content is an iterative process.

In one embodiment the filtration comprises subjecting the source of milk protein to at least one filtration step to produce a protein retentate.

In one embodiment the filtration comprises contacting the milk protein with a cation ion exchange resin, the counter ions in the resin comprising sodium, potassium or sodium and potassium, to replace at least about 15 to about 30% of the divalent cations in the retentate with sodium, potassium or sodium and potassium.

In one embodiment the cation resin is a sodium-cation resin.

In one embodiment the retentate undergoes further mineral adjustment by mixing the mineral adjusted retentate with a further source of milk protein and/or retentate to produce a mixed retentate with a standardised mineral content.

In those embodiments in which the mineral content of the milk protein is altered by filtration, the retentate is subjected to filtration comprising ultrafiltration or microfiltration or both, using a diafiltration medium consisting of water supplemented with added potassium and/or sodium ions to produce a retentate with additional mineral adjustment.

Preferably the diafiltration medium contains specified amounts of dissolved potassium ions.

In one embodiment the milk protein is acidified through the addition of a food grade acid.

In one embodiment the milk protein is subjected to fermenting acidification through the addition of lactic acid starter bacteria.

In one embodiment the milk curd is particularised. Preferably by grinding.

In one embodiment the mixture includes the addition of whey protein gel particles.

In one embodiment the whey protein gel particles are prepared from a whey protein solution.

In some embodiments the lipid-whey mixture is an emulsion.

In some embodiments the lipid-whey mixture is mixed with a high speed mixer.

In some embodiments the lipid-whey mixture is homogenised at relatively low pressure, being up to 100, 120, 140, 160, 180 or 200 bar, and useful ranges may be selected between any of these values.

In one embodiment the temperature during mixing of the whey protein solution with the mixture is maintained at about 50° C.

In some embodiments the lipid source is a milk lipid. Preferably the milk lipid is selected from cream, high fat cream, or anhydrous milk fat.

In some embodiments the emulsion is prepared in absence of added emulsifier.

In some embodiments other milk product are added, such as GRAS ingredients.

In some embodiments the lipid combined with the whey protein solution accounts for at least 70, 75, 80, 85, 90, 95 or 100% of the total fat in the final cheese product, and useful ranges may be selected between any of these values.

In some embodiments the mixture of whey and lipid is heated to at least 65, 70, 75, 80 or 85° C., for at least about 10, 15, 20, 25, 30, 35 or 40 seconds, and useful ranges may be selected between any of these values.

In some embodiments the heated emulsion of whey protein and lipid is cooled to a low temperature (e.g. 4° C.) appropriate for storage, and can be used at a later date.

In alternate embodiments the heated emulsion is added directly, while it is hot, as an ingredient, to the mixture of ingredients for making mozzarella or pasta filata cheese.

In one embodiment the heated cheese mass is stretched in a mozzarella or pasta filata kneader/stretcher device.

In one embodiment the heated cheese mass is placed onto a casting device, which cools the cheese to form a continuous sheet or ribbon.

In one embodiment the cast cheese is shredded to produce individual shredded cheese particles.

In one embodiment an anticaking agent is added to the shredded cheese particles.

In one embodiment the shredded cheese particles are immediately frozen as Individually Quick Frozen (IQF) shredded particles.

In one embodiment the molten cheese mass is placed into a low temperature extruder to extrude and cut the cheese mass as shreds immediately into a freezer.

In one embodiment the pasta filata cheese limits moisture release (syneresis) and loss during baking.

In one embodiment the pasta filata cheese, when present as a frozen IQF shred, can be immediately placed upon a pizza without thawing and the pizza baked and the cheese will produce all the desired functional effects.

The term "comprising" as used in this specification and claims means "consisting at least in part of". When interpreting statements in this specification and claims which include the term "comprising", other features besides the features prefaced by this term in each statement can also be present. Related terms such as "comprise" and "comprised" are to be interpreted in similar manner.

As used herein the term "and/or" means "and" or "or", or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention will now be described by way of example only and with reference to the drawings in which:

FIG. 1 shows a process flow diagram of the process of the present invention.

DETAILED DESCRIPTION OF THE INVENTION

The invention relates to a high moisture pasta filata cheese, such as a mozzarella, that has a moisture content of at least about 55% by weight. The cheese contains a solids-non-fat content of up to about 45% by weight, the solids-non-fat comprising at least about 70% by weight protein, the protein comprising at least about 65% by weight casein, and has an adjusted mineral content.

The adjusted mineral content comprises a total divalent cation content of about 25, 30, 35, 40, 45, 50, 55, 60, 65, 70 or 75 mMol of divalent cations/100 g casein, and useful ranges may be selected between any of these values (for example, about 25 to about 75, about 25 to about 65, about 25 to about 50, about 25 to about 45, about 30 to about 75, about 30 to about 70, about 30 to about 0, about 30 to about 45, about 35 to about 75, about 35 to about 65, about 35 to about 60, about 35 to about 55, about 40 to about 75, about 40 to about 70, about 40 to about 65, about 45 to about 75, about 45 to about 65, about 50 to about 75, about 55 to about 65, about 60 to about 75, about 60 to about 70, or about 65 to about 75 mMol of divalent cations/100 g casein).

The adjusted mineral content also comprises a total divalent cation content of about 50, 60, 70, 80, 90, 100, 110, 120, 130, 140 or 150 meq divalent cations/100 g casein, and useful ranges may be selected between any of these values (for example, about 50 to about 150, about 50 to about 130, about 50 to about 110, about 50 to about 80, about 60 to about 150, about 60 to about 140, about 60 to about 10, about 60 to about 100, about 70 to about 150, about 70 to about 130, about 70 to about 120, about 70 to about 110, about 80 to about 150, about 80 to about 130, about 80 to about 100, about 90 to about 150, about 90 to about 140, about 90 to about 120, about 100 to about 150, about 100 to about 140, about 110 to about 150, about 110 to about 130, about 120 to about 150, about 120 to about 140, or about 130 to about 150 meq divalent cations/100 g casein).

The adjusted mineral content also comprises a total monovalent cation content of about 100, 120, 135, 150, 165, 180, 190, 195, 210, 225, 240 or 250 mMol monovalent cations/100 g casein, with a ratio of monovalent cations to divalent cations of at least about 3.25 parts monovalent cations to 1 part divalent cations (measured as mMol/100 g casein), and useful ranges may be selected between any of these values (for example, about 100 to about 250, about 100 to about 190, about 100 to about 195, about 100 to about 135, about 120 to about 250, about 120 to about 210, about 120 to about 190, about 120 to about 165, about 120 to about 135, about 135 to about 250, about 135 to about 225, about 135 to about 195, about 135 to about 150, about 150 to about 250, about 150 to about 240, about 150 to about 195, about 150 to about 180, about 165 to about 250, about 165 to about 225, about 165 to about 180, about 180 to about 250, about 180 to about 210, about 180 to about 195, about 195 to about 250, about 195 to about 225, about 210 to about 250, about 210 to about 240, or about 225 to about 250 mMol monovalent cations/100 g casein).

The adjusted mineral content also comprises a total monovalent cation content of about 100, 120, 135, 150, 165, 180, 195, 210, 225, 240 or 250 meq monovalent cations/100 g casein, and useful ranges may be selected between any of these values (for example, about 100 to about 250, about 100 to about 195, about 100 to about 135, about 120 to about 250, about 120 to about 210, about 120 to about 165, about 120 to about 135, about 135 to about 250, about 135 to about 225, about 135 to about 195, about 135 to about 150, about 150 to about 250, about 150 to about 240, about 150 to about 195, about 150 to about 180, about 165 to about 250, about 165 to about 225, about 165 to about 180, about 180 to about 250, about 180 to about 210, about 180 to about 195, about 195 to about 250, about 195 to about 225, about 210 to about 250, about 210 to about 240, or about 225 to about 250 meq monovalent cations/100 g casein).

The adjusted mineral content also comprises a total cation content of about 150, 160, 170, 180, 190, 200, 210, 220, 230, 240, 250, 260, 270, 280, 290 or 300 mMol total cations/100 g casein, and useful ranges may be selected between any of these values (for example, about 150 to about 300, about 150 to about 280, about 150 to about 260, about 150 to about 230, about 150 to about 200, about 150 to about 180, about 160 to about 300, about 160 to about 270, about 160 to about 230, about 160 to about 210, about 160 to about 200, about 170 to about 300, about 170 to about 280, about 170 to about 250, about 170 to about 210, about 170 to about 190, about 180 to about 300, about 180 to about 280, about 180 to about 260, about 180 to about 250, about 180 to about 210, about 190 to about 300, about 190 to about 290, about 190 to about 250, about 190 to about 210, about 200 to about 300, about 200 to about 290, about 200 to about 280, about 200 to about 260, about 200 to about 240, about 210 to about 300, about 210 to about 280, about 210 to about 270, about 220 to about 300, about 220 to about 250, about 230 to about 300, about 230 to about 250, about 240 to about 300, about 240 to about 270, about 250 to about 300, about 250 to about 270, about 260 to about 300, about 260 to about 280 or about 270 to about 300 mMol total cations/100 g casein).

The adjusted mineral content also comprises:
less than about 2840 mg calcium/100 g casein, or less than about 70 mMol calcium/100 g casein, or less than about 140 meq. calcium/100 g casein, and
less than about 145 mg magnesium/100 g casein, or less than about 6.0 mMol magnesium/100 g casein, or less than 12.0 meq magnesium/100 g casein,
less than about 16.5 μg manganese/100 g casein, less than about 0.3 μmMol manganese/100 g casein, and/or less than about 0.00006 meq manganese/100 g casein,
less than about 13 mg zinc/100 g casein, less than 0.2 μMol zinc/100 g casein, and/or less than 0.0004 meq zinc/100 g casein,
less than about 4.5 g sodium/100 g casein, less than about 195 mMol sodium/100 g casein, and/or less than about 195 meq sodium/100 g casein,
less than about 0.2 g potassium/100 g casein, less than about 5.0 mMol potassium/100 g casein, and/or less than about 5.0 meq potassium/100 g casein, and
less than about 4 g phosphate/100 g casein, or less than 795 mMol phosphate/100 g casein.

The total monovalent cation content is determined as either the sum of the g sodium/100 g casein plus the g potassium/100 g casein, the sum of the mMol sodium/100 g casein plus the mMol potassium/100 g casein, and/or the sum of the meq sodium/100 g casein plus the meq potassium/100 g casein.

The total divalent cation content is determined as either the sum of the g calcium/100 g casein plus the g magnesium/100 g casein plus the g manganese/100 g casein and plus the g zinc/100 g casein, the mMol calcium/100 g casein plus the mMol magnesium/100 g casein plus the mMol manganese/100 g casein and plus the mMol zinc/100 g casein, and/or the meq calcium/100 g casein plus the meq magnesium/100 g casein plus the meq manganese/100 g casein and plus the meq zinc/100 g casein.

The total cation content is determined as the sum of the monovalent cations plus the sum of the divalent cations when determined as either g cations/100 g casein, mMol cations/100 g casein, and/or meq cations/100 g casein.

The total ion content includes the sum of the total cation content determined as either g cation content/100 g casein plus g phosphate/100 g casein, mMol cation content/100 g casein plus mMol phosphate/100 g casein, and/or meq cation content/100 g casein plus meq phosphate/100 g casein.

In one embodiment the pasta filata cheese comprises up to about 75 mMol/100 g casein of total monovalent cations comprising about 2.5 to about 72.5 mMol sodium/100 g casein and about 2.5 to about 35 mMol potassium/100 g casein.

In one embodiment the pasta filata cheese comprises up to about 250 mMol/100 g casein of total monovalent cation comprising about 175 to about 247.5 mMol sodium/100 g casein and about 2.5 to about 75 mMol potassium/100 g casein.

In some embodiments the pasta filata cheese comprises at least about 1, 2, 2.5, 3, 4, 5, 6, 7, 7.5, 8, 9, 10, 11, 12, 12.5, 13, 14, 15, 16, 17, 17.5, 18, 19, 20, 21, 22, 22.5, 23, 24, 25, 26, 27, 27.5, 28, 29 or at least about 30% by weight fat, and useful ranges may be selected between any of these values (for example, from about 1% to about 30%, about 5% to about 30%, about 10% to about 30%, about 17% to about 20%, about 20% to about 30%, about 25% to about 30%, about 27% to about 30%, about 27.5% to about 30%, about 1% to about 27.5% by weight fat, about 5% to about 27.5%, about 10% to about 27.5%, about 17% to about 27.5%, about 17% to about 27%, about 20% to about 25%, about 1% to about 22% by weight fat, about 5% to about 22%, about 10% to about 22%, about 17% to about 22%, about 1% to about 20%, about 5% to about 20%, about 10% to about 20%, about 1% to about 10% or about 1% to about 5% by weight fat).

In some embodiments the pasta filata cheese comprises at least about 15, 16, 17, 17.5, 18, 19, 20, 21, 22, 22.5, 23, 24, 25, 26, 27, 27.5, 28, 29, 30, 31, 32, 32.5, 33, 34, 35, 36, 37, 37.5, 38, 39, 40, 41, 42, 42.5, 43, 44, or about 45% by weight solids-non-fat, and useful ranges may be selected between any of these values (for example, from about 15% to about 45%, about 15% to about 44%, about 20% to about 44%, about 25% to about 44%, about 30% to about 44%, about 35% to about 44%, about 15% to about 40%, about 20% to about 40%, about 25% to about 40%, about 30% to about 40%, about 35% to about 40%, about 15% to about 35%, about 20% to about 35%, about 25% to about 35%, about 30% to about 35%, about 15% to about 30%, about 20% to about 30% about 25% to about 30%, about 18% to about 28%, about 15% to about 25%, about 20% to about 25%, about 20% to about 23%, or from about 15% to about 20% by weight solids-non-fat).

In one embodiment the pasta filata cheese is a reduced fat pasta filata cheese. In one embodiment the reduced fat pasta filata cheese comprises from about 1% to about 10% by weight fat.

In some embodiments the reduced fat pasta filata cheese comprises
a) from about 1% to about 10% by weight fat and from about 35% to about 44% by weight solids-non-fat,
b) from about 2.5% to about 7.5% by weight fat and from about 37.5% to about 42.5% by weight solids-non-fat, or
c) about 5% by weight fat and about 40% by weight solids-non-fat.

In one embodiment the pasta filata cheese is a high fat pasta filata cheese. In one embodiment the high fat pasta filata cheese comprises from about 17% to about 27% by weight fat.

In some embodiments the high fat pasta filata cheese comprises
a) from about 17% to about 27% by weight fat and from about 18% to about 28% by weight solids-non-fat,
b) from about 20% to about 25% by weight fat and from about 20% to about 25% by weight solids-non-fat, or
c) about 25% by weight fat and about 20% by weight solids-non-fat.

In one embodiment the pasta filata cheese is a very high fat pasta filata cheese. In one embodiment the very high fat pasta filata cheese comprises from about 25% to about 30% by weight fat.

In some embodiments the high fat pasta filata cheese comprises
a) from about 25% to about 30% by weight fat and from about 15% to about 20% by weight solids-non-fat,
b) from about 27% to about 30% by weight fat and from about 20% to about 23% by weight solids-non-fat, or
c) about 27.5% by weight fat and about 17.5% by weight solids-non-fat.

The pasta filata cheese can be used in a wide range of food products that use cheeses. A benefit of the present high moisture pasta filata cheese, compared to lower moisture containing pasta filata cheeses, is the improved mouthfeel and organoleptic properties. For example, pasta filata cheeses with a lower moisture content than pasta filata cheeses of the present invention, can lead to a rubbery or chewy experience. In contrast, a high moisture pasta filata cheese of the present invention does not suffer from this problem.

Pasta filata cheeses with high moisture content include cheeses such as Bocconcini. Bocconcini-style cheese are semi-soft, white, rindless, and unripened mild cheeses that are typically stored in liquid before use. Although such cheeses may be used as a pizza topping, the performance of Bocconcini-style cheese on pizza typically is inferior to Mozzarella.

A popular use of pasta filata cheeses such as mozzarella is its addition as a pizza topping.

In one embodiment, upon use on or in a food product, the cooked pasta filata cheese exhibits the characteristics of:
 i) a blister percentage of less than 35%,
 ii) a maximum blister size score of less than 20 mm,
 iii) a pizza blister Hunter L scale colour value of less than 50,
 iv) a melt value of less than 6 on the (FRDC) modified Schreiber melt test,
 v) a free oil content of less than 20% cheese mass,
 vi) a stretch of less than 50 cm, and
 vii) any combination of two or more of (i) to (vi) above.

The performance of the cheese based on blister size and percentage is described as follows. Cheese pizza is prepared and baked as described above. Any blisters forming upon cheese surface of the baked pizza are counted, and the radius of the blister measured directly in mm using a caliper. The number of blisters with the same relative diameter of quantified (i.e. 0 to 5 mm, 5 to 10 mm etc.) and the area of the blisters calculated using the standard equation for determining the area of a circle:

$$A=\pi r^2$$

Where
 A=the area of the circle
 π=the mathematical function pi, and
 r=the radius of the circle.

The number of blisters within each size category is multiplied time the category blister area. The blister areas for each categorical size are combined, and used to calculate the blister percentage for the entire cheese surface.

A blister percentage of less than 35% indicates an acceptable cheese performance. A blister percentage greater than 35% indicates an unacceptable performance of the cheese.

The performance of the cheese based on blister Colour is described as follows. Blister colour is compared to prepared standards that typically consist of blocks of colour progressing from white, tan, medium dark tan, dark tan, to black. (These somewhat resemble the National Cheese Institute Cheese Color Standards, except showing the colour transition from white to various shades of tan to black.)

Alternatively, blister colour can be directly measured by an appropriate colorimeter and scale, such as the Hunter L-a-b scale.

A pizza blister Hunter L scale colour value of less than 50 indicates an acceptable cheese performance. A pizza blister Hunter L scale colour value of greater than 50 indicates an unacceptable cheese performance.

The performance of the cheese based on background Colour is described as follows. The colour of the cheese baked on a pizza with sauce as described above is also typically compared to prepared colour standards, with standards showing Transparent, Transparent to White, White to pale Yellow, Pale Yellow to Yellow, and Yellow to Brown.

Again, overall pizza cheese colour can be measured directly by an appropriate colorimeter and scale, such as the Hunter L-a-b scale.

A pizza blister Hunter L scale colour value of less than 50 indicates an acceptable cheese performance. A pizza blister Hunter L scale colour value of greater than 50 indicates an unacceptable cheese performance.

The performance of the cheese based on melt/meltability is described as follows. A number of quantitative methods are available to measure the meltability of various cheese varieties (Park et al., 1984). The Schreiber melt test was originally designed for use on process cheese products, and especially for "slice" process cheese products. However, minor modifications allow use for measuring the melt of Mozzarella and pasta filata cheeses.

Modifications to the Schreiber melt test for measuring the meltability of Mozzarella and pasta filata cheese include:
Weigh 5±0.05 g of thawed cheese shred into a circular form, 39.5 mm diameter, that is set into a glass (100×20 mm thin walled) petri dish bottom,
compress the cheese shreds into a fused mass (about 2 mm in thickness),
place the petri dish cover on the sample, and place prepared sample into a preheated 232° C. oven and bake for 5:00 minutes,
remove treated sample from the oven to a cooling rack and cool for 30 minutes, and
remove petri dish lid and place dish upon Schreiber melt test chart (a chart containing a series of concentric circles starting at 39.5 mm in diameter, with the diameter of each succeeding circle 2 mm greater.
report the Schreiber melt test score as listed on the concentric circles (i.e. sequentially 0 to 12).

These techniques are described in Park, J., J. R. Rosenau, and M. Peleg. 1984. "Comparison of four procedures of cheese meltability evaluation". *J. Food Sci.* 49:1158-1162, & 1170 and Zehren, V, L., and D. D. Nusbaum, 1962. Process Cheese. Cheese Reporter Publishing Co., Inc. Madison, Wis.

A melt value of less than 6 on the (FRDC) modified Schreiber melt test indicates an acceptable cheese performance. A melt value of greater than 6 on the (FRDC) modified Schreiber melt test indicates an unacceptable cheese performance.

The performance of the cheese based on free oil (oiling off) is described as follows. Free oil (oiling off) measurements show the amount of free fat released by the cheese after baking on a pizza. Free oil is quantitatively measured by the method of Kindstedt and Rippe (1990) following the following sequence of steps:
Quantitatively weigh 18 g of cheese into either a 20 or 50% Paley-Babcock bottle,
immerse the bottle(s) in boiling water for 4.0 minutes to melt the cheese,
add 20 ml of distilled water at 57.5° c. each bottle and centrifuge the prepared samples at 57.5° c. for 10 minutes,
add sufficient amounts of 1:1, water:methanol solution, at 21° C. to rise the liquid level into the upper section of the graduated column of the bottle, and the centrifuge bottles for 2 minutes,
"hand rock" the bottles for 10 seconds (at ambient temperature), centrifuge again for 2 minutes, hand rock again for 10 seconds, and then centrifuge for another 2 minutes,
finally, immerse the bottles in a water bath set to a temperature of 57.5° C. for 5 minutes, add glymol to the surface of the top of fat column (which eliminates the meniscus), and measure the fat content by standard Babcock cream test procedures.

The free oil content can be expressed directly, or as the percentage of free fat per the amount of cheese and/or the amount of cheese fat.

A free oil content of less than 20% cheese mass indicates an acceptable cheese performance. A free oil content of greater than 20% cheese mass indicates an unacceptable cheese performance.

These techniques are described in Kindstedt, P. S., and 3. K. Rippe. 1990. "Rapid quantitative test for free oil (oiling off) in melted Mozzarella cheese". *J. Dairy Sci.* 73:867-873.

The performance of the cheese based on cheese stretch is described as follows. Stretch is typically determined directly from a cheese pizza prepared and baked exactly as described above. Immediately upon removal from the oven, a fork is inserted into molten cheese in the centre of pizza, and the fork raised in a manner to stretch the molten cheese. Then length of the cheese stretch is measured in cm with a ruler until the stretched cheese breaks.

A stretch of less than 50 cm indicates an acceptable cheese performance. A stretch of greater than 50 cm indicates an unacceptable cheese performance The performance of the cheese based on free serum is described as follows. Guo and Kindstedt (1995) "Age-related changes in the water phase of Mozzarella cheese". *J. Dairy Sci.* 78:2099-2107 describe the procedure for producing free serum from Mozzarella cheese as follows:
Quantitatively weigh 160 g of shredded Mozzarella into 250 mL plastic centrifuge bottle and cap,
Centrifuge at 12,500×g for 75 minutes at 25° C., and
Quantitatively collect the serum portion for desired analysis (e.g. protein, minerals, etc.).

Tenderness on chewing currently is measured by trained sensory panels, evaluating the cheese immediately upon baking on a pizza as described above.

In one embodiment the high moisture pasta filata cheese when present as an frozen IQF shred can be immediately placed upon a pizza without thawing and the pizza baked and the cheese will produce all the desired functional effects.

1. Manufacturing Method

The invention also relates to a process for making a pasta filata cheese comprising the steps of
b) providing a source of milk protein comprising
   i) at least 65 to 99% casein, and
   ii) a total divalent cation content of about 25 to about 75 mMol of divalent cations/100 g casein, or a total divalent cation content of about 50 to about 150 meq divalent cations/100 g casein, and
   iii) a total monovalent cation content of about 100 to about 250 mMol monovalent cations/100 g casein, or a total monovalent cation content of about 100 to about 250 meq monovalent cations/100 g casein, and
   iv) a total cation content of about 150 to about 300 mMol total cations/100 g casein, and
   v) a pH of from about 4.9 to about 6,
c) contacting the source of milk protein with a coagulating agent at a temperature of 8 to 40° C. to produce a milk curd,
d) mixing at least one lipid ingredient and the curd to produce a mixture,
e) heating and mechanically working the mixture at a temperature of from about 65 to about 90° C. to produce a heated cheese mass, and
f) processing the heated cheese mass to form a pasta filata cheese product.

This method preferably includes a step to adjust the monovalent cation content to obtain
   i) a total monovalent cation content of about 100 to about 250 mMol monovalent cations/100 g casein, or a total monovalent cation content of about 100 to about 250 meq monovalent cations/100 g casein, and
   ii) a total cation content of about 150 to about 300 mMol total cations/100 g casein.

The monovalent adjustment step could be carried out on the curd, on the mixture (i.e. in the blend tank), the cheese mass or a combination thereof. The adjustment of the monovalent content can be to reduce specific monovalent cations, or to reduce all monovalent cations. The adjustment step also includes increasing specific monovalent cations or all monovalent cations present. As an example, the addition of NaCl can be carried out as an adjustment step. KCl could also be used, but NaCl is preferred.

The present invention can be carried out in the manufacturing plant (of pasta filata cheese). For example, the first step is to make a batch of pasta filata cheese by
   i) providing a source of milk protein comprising at least 65 to 99% by weight casein and a pH of from about 4.9 to about 6,
   ii) contacting the source of milk protein with a coagulating agent at a temperature of 8 to 50° C. to produce a milk curd,
   iii) mixing at least one lipid ingredient to the curd to produce a mixture,
   iv) heating and mechanically working the mixture at a temperature from about 65 to about 90° C. to produce a heated cheese mass, and
   v) processing the heated cheese mass to form a first pasta filata cheese product.

Once the product has been produced it can be analysed to determine the monovalent and the divalent content. Using these results, successive batches of pasta filata cheese can be modified by adjusting the monovalent and divalent content as required to meet the desired content. i.e.
   a total divalent cation content of about 25 to about 75 mMol of divalent cations/100 g casein, or a total divalent cation content of about 50 to about 150 meq divalent cations/100 g casein, and
   a total monovalent cation content of about 100 to about 250 mMol monovalent cations/100 g casein, or a total monovalent cation content of about 100 to about 250 meq monovalent cations/100 g casein, and
   a total cation content of about 150 to about 300 mMol total cations/100 g casein.
   In some instances this may be an iterative process.

In one embodiment the mixture is heated and mechanically worked at a temperature of 65, 70, 75, 80, 85 or 90° C. and useful ranges may be selected between any of these values (for example, about 65 to about 90, about 65 to about 85, about 65 to about 80, about 65 to about 75, about 70 to about 90, about 70 to about 85, about 70 to about 80, about 75 to about 90, about 75 to about 85, about 75 to about 80, about 80 to about 90, about 80 to about 85, or about 85 to about 90° C.).

The source of the milk protein can be from a wide range of milk products. The milk products for use are required to contain at least casein. For example, the source of milk protein could be whole fat milk, whole milk retentate/concentrate, semi skimmed milk, skimmed milk, skimmed retentate/concentrate, butter milk, butter milk retentate/concentrate and whey protein retentate/concentrate or from products made from milk as would be appreciated by a person skilled in the art. One or more powders, such as whole milk powder, skimmed milk powder, milk protein concentrate powder, milk protein isolate powder, total milk protein powder, rennet casein, lactic casein, sodium caseinate, potassium caseinate, calcium caseinate, whey protein concentrate powder, whey protein isolate powder and buttermilk powder or other powders made from milk, reconstituted or dry, singularly or in combination may also be selected as the starting milk or be added to the starting milk.

Where the source of milk protein includes a lipid content, such as raw milk, the lipid is first separated off, such as through the use of centrifugal separation. This separation leads to a source of milk protein substantially free of lipid. The separated lipid in the form of cream can be processed to a high fat cream or anhydrous milk fat for later inclusion into the cheese making process in the blend tank.

The protein and fat composition of the milk protein may be altered by a process known as standardisation. The process of standardisation involves removing the variability in the fat and protein composition of the starting milk to achieve a particular end cheese composition. Traditionally, standardisation of milk has been achieved by removing nearly all the fat (cream) from the starting milk (separation) and adding back a known amount of cream thereto to achieve a predetermined protein/fat ratio in the starting milk. The amount of fat (cream) required to be removed will depend upon the fat content of the starting milk and the required end cheese composition. Preferably, the starting milk has a fat content of at least 0.05%. If higher fat contents are required a separate side stream of cream may be added to raise the fat content of the starting milk or the final cheese product as would be appreciated by a skilled worker. Additionally or alternatively, the protein concentration may be altered by adding a protein concentrate such as a UF retentate or powder concentrate to a starting milk composition, or by any other method as would be appreciated by a person skilled in the art.

In some embodiments, a lipid source is used to standardise the milk protein. In some instances the lipid source may derive from the lipid separated from the fat-containing source of milk protein. Where the source of milk-protein is already substantially devoid of lipid, the lipid standardisation source may derived from other milk streams. For example, lipid produced as a by-product of skim milk manufacture.

In some embodiments the milk protein, that has optionally been standardised for lipid content, is pasteurized. Pasteurisation may be carried out on any liquid stream at any stage of the process and in particular the starting milk and cream streams under standard condition as is known in the art. Optionally the cream is homogenised. Pasteurization for fluid products in large continuously processing plants is typically performed with equipment called a "Plate Heat Exchanger" using the High Temperature Short Time (HTST) process. The minimum heat treatments for milk are 72° C. for 15 sec, and for cream 74.4° C./15 sec. The pasteurization heat treatments frequently exceed the minimum requirements.

The milk protein is processed to adjust the mineral content. The adjustment of mineral content reduces the amount of specified cations (e.g. calcium and magnesium) present in the casein, replacing these cations with other ions such as potassium and/or sodium.

The mineral adjustment can be achieved through the addition of acid, the use of ion exchange, and/or through the use of mineral chelators or a combination thereof.

In relation to the use of ion exchange, the monovalent cations introduced into milk for exchange with divalent cations in the micelles are sodium and potassium ions or both, but other monovalent ions may be included with the sodium and/or potassium, for example, hydrogen ions, $H^+$. In a preferred embodiment, the added monovalent cations replace the divalent cations, calcium, $Ca^{++}$, $Mg^{++}$, $Mn^{++}$, and/or $Zn^{++}$ bound within the casein micelles.

Ion exchange is a method for exchanging monovalent cations for divalent cations in native casein micelles of the prepared milk and/or retentate. Ion exchange preferably is performed by processing milk and/or retentate with an appropriately charged or activated medium, such as a functionalized gel polymer or resin. These methods include those disclosed in published PCT applications WO 2001/41579 and WO 2001/41578, and US Patent applications 2003/0096036 and 2004/0197440, hereby incorporated by reference in their entirety. The source of milk protein is prepared by removal of calcium using cation exchange chromatography, preferably on a resin bearing strongly acidic groups, for example, sulfonate groups (in the sodium or potassium form). Preferably, the pH of the milk material subjected to calcium depletion is adjusted to have a pH in the range 6.0-6.5 prior to ion exchange treatment. Any food approved acidulent may be used, but lactic acid and sources of lactic acid or citric is preferred. Vinegar, acetic acid and phosphoric acid may also be used. The calcium-depleted milk product may be used as a liquid ingredient or dried to produce a dried ingredient. The extent of calcium depletion may be varied by altering the chromatography conditions, for by varying the nature and volume of the resin, the nature and amount of milk material, the space velocity (ratio of volume flow rate to resin bed volume), the blending of treated milk with untreated milk, the temperature, pH, etc. Alternatively, electrodialysis is another preferred procedure for performing the desired cation exchange in milk. Milk is processed with an appropriate membrane system maintained at an appropriate electrical potential.

In another embodiment, electrodialysis and other preferred membrane procedures are combined with diafiltration. Diafiltration enhances the purity of the casein portion of the retentate.

Diafiltration also promotes the desired exchange of monovalent cations for divalent cations in the casein micelle when defined amounts of salt, or sodium chloride, are added to the water.

In a further embodiment, divalent ions are removed using low pH ultrafiltration and/or diafiltration, for example, as described in US patent application 2003/0096036 and WO 01/41579. In a further embodiment the composition to be cooked is prepared from centrifuged, heat treated neutralised casein and whey proteins.

In preferred embodiments of the invention, at least 10% to 50% of the divalent cations bound to caseins and divalently holding the micelles together are exchanged with monovalent cations, more preferably 15% to 30%, most preferably 15% to 25%. Preferably the divalent cations are replaced by sodium or potassium or both, preferably by sodium.

When the calcium and/or magnesium removal is by way of addition of a chelating agent, preferred chelating agents for use include citric acid, EDTA, food phosphates/polyphosphates, food acidulants, tartaric acid, citrates and tartrates. The preferred chelating agents are food acidulating agents. The chelating agents may be used before, during or following ultrafiltration or diafiltration stages or independently of an ultrafiltration or diafiltration."

In relation to the addition of acid, this can be achieved by adding a food-appropriate acid to the milk protein. Alternately, a bacterial source (such as a lactic acid producing bacterial strain) could be use as a source of the acid.

In those embodiments where ion exchange is used, a first step can be a fractionation step. Fractionation can be achieved through the use of membrane filtration. For example, through the use of ultrafiltration to produce a concentrated protein fraction.

The retentate is then contacted with an ion exchange membrane such as an appropriate resin. In one embodiment the ion exchange process uses a sodium and/or potassium cation ion exchange resin to replace at least 20% of the divalent cations in the retentate with sodium and/or potassium, thereby altering the ratio of divalent-to-monovalent cations-to-phosphate in the retentate.

In some embodiments the milk protein undergoes further mineral adjustment by mixing the mineral adjusted milk protein retentate with an unprocessed milk protein source, such as skim milk, and/or retentate to produce a mixed retentate with a standardized mineral content.

The retentate from ion exchange can be processed by filtration, including either ultrafiltration and/or microfiltration, using a diafiltration medium consisting of water supplemented with added potassium and/or sodium ions to produce a retentate with additional mineral adjustment. The retentate is then used in the remainder of the cheese making process.

The milk protein is, where required, pH adjusted to a pH of from about 4.9 to about 6 using a food grade acid. In some embodiments the food grade acid is selected from acetic, citric, lactic, phosphoric, gluconic, sulphuric acid, glucono-delta lactone, and combinations thereof.

In some embodiments the milk protein is cooled to 0, 5, 10, 15, 20, 25, 30 or 40° C., and useful ranges may be selected between any of these values (for example, about 0 to about 40, about 0 to about 30, about 0 to about 25, about 0 to about 20, about 0 to about 10, about 5 to about 40, about 5 to about 30, about 5 to about 25, about 5 to about 20, 5 to about 15, about 10 to about 40, about 10 to about 30, about 10 to about 20, about 10 to about 15, about 15 to about 40, about 15 to about 30, about 15 to about 25, about 15 to about 20, about 20 to about 40, about 20 to about 30, about 20 to about 25, about 25 to about 40, or about 25 to about 30° C.).

In some embodiments a lactic acid starter bacteria is added to the mineral-adjusted milk protein stream. The starter bacteria ferment residual lactose to acidify the milk protein stream.

As is standard in cheese making processes, a casein coagulating enzyme is added to the casein to form a curd. Typically curd formation is achieved through the addition of rennet, although various coagulating enzymes are known. In some embodiments the casein coagulating enzyme is selected from calf rennet, also known as chymosin, or bovine pepsin, porcine pepsin, microbial rennets, and/or recombined microbial chymosin and microbial coagulants. Common microbial rennets are produced by *Rhizomucor miehei, Rhizomucor pusillus Lindt*, and *cryphonoctria parasitica* (all fungi), and genetically engineered calf rennets may be produced from *Kluyveromyces lactis, Aspergillus niger*, and/or *Escherichia coli*.

In some embodiments the source of milk protein is contacted with a coagulating agent at a temperature of about 8, 10, 15, 20, 25, 30, 35, 40, 45 or about 50° C. to produce a milk curd, and suitable ranges may be selected form between thee values, for example from about 8 to about 50° C., about 10 to about 50° C., about 20 to about 50° C., about 25 to about 50° C., about 30 to about 50° C., about 8 to about 40° C., about 20 to about 40° C. or about 25 to about 40° C.

In some embodiments the renneted milk protein is held for about 0.001, 0.01, 0.5, 1, 2, 5, 6, 7, 8, 9, 10, 11, 12, 13, 14, 15 and 16 hours, and useful ranges may be selected between any of these values (for example, about 0.001 to about 16, about 0.001 to about 15, about 0.001 to about 12, about 0.001 to about 10, about 0.001 to about 8, about 0.001 to about 6, about 0.001 to about 2, about 0.001 to about 1, about 0.001 to about 0.5, about 0.001 to about 0.01, about 0.01 to about 16, about 0.01 to about 15, about 0.01 to about 12, about 0.01 to about 10, about 0.01 to about 8, about 0.01 to about 6, about 0.01 to about 2, about 0.01 to about 1, about 0.01 to about 0.5, about 0.5 to about 16, about 0.5 to about 15, about 0.5 to about 12, about 0.05 to about 10, about 0.5 to about 8, about 0.5 to about 6, about 0.5 to about 2, about 0.5 to about 1, about 1 to about 16, about 1 to about 15, about 1 to about 12, about 1 to about 10, about 1 to about 8, about 1 to about 6, about 1 to about 2, about 2 to about 16, about 2 to about 15, about 2 to about 12, about 2 to about 10, about 2 to about 8, about 2 to about 6, about 2 to about 3, about 5 to about 16, about 3 to about 15, about 3 to about 12, about 3 to about 10, about 3 to about 8, about 3 to about 6, about 3 to about 2, about 6 to about 16, about 6 to about 15, about 6 to about 12, about 6 to about 10, about 6 to about 8, about 8 to about 16, about 8 to about 15, about 8 to about 12, about 8 to about 10, about 10 to about 16, about 10 to about 15, about 10 to about 12, about 12 to about 16, about 12 to about 15, about 12 to about 14, about 14 to about 16 hrs).

In some embodiments the treated milk protein is acidified by the addition of an acid to reduce the pH to about 4.85 to about 6.4, but more particularly to about 5.2 to about 6.0. In some embodiments the pH adjustment is carried out at a temperature of 5, 6, 7, 8, 9, 10, 11, 12, 13, 14 or 15° C.

In some embodiments the acid is selected from sulphuric, lactic, citric, and acetic acid, and combinations thereof.

Once the curd has coagulated it is cooked, undergoes syneresis and the curd is then separated from the whey. In some embodiments the curd is heated with direct steam injection to about 30, 31, 32, 33, 34, 35, 36, 37, 38, 39, 40, 41, 42, 43, 44, 45, 46, 47, 48, 49 or 50° C. In some embodiments the curd is held at heat for about 40, 41, 42, 43, 44, 45, 46, 47, 48, 49, 50, 51, 52, 53, 54, 55, 56, 57, 58, 59 or 60 seconds.

In some embodiments the curd is washed with acidified water. In some embodiments a decanting separator is used to separate the curd from the wash water. The removal of whey and subsequent wash water is referred to in the art as dewheying and/or dewatering.

In some embodiments the target calcium range in the curd is about 115 to about 210 mMol Ca/kg cheese.

In some embodiments the target fat content of the washed curd is 12, 13, 14, 15, 16, 17, 18, 19, 20, 21, 22, 23, 24, 25, 26, 27, 28, 29 or 30% by weight, and useful ranges may be selected between any of these values (for example, about 12 to about 30, about 12 to about 28, about 12 to about 26, about 12 to about 25, about 1 to about 23, about 12 to about 18, about 13 to about 30, about 13 to about 26, about 13 to about 22, about 13 to about 20, about 13 to about 17, about 13 to about 15, about 14 to about 30, about 14 to about 18, about 15 to about 30, about 15 to about 27, about 15 to about 26, about 15 to about 24, about 15 to about 20, about 16 to about 30, about 16 to about 27, about 16 to about 24, about 16 to about 20, about 17 to about 30, about 17 to about 27, about 17 to about 24, about 17 to about 21, about 18 to about 30, about 18 to about 26, about 18 to about 22, about 19 to about 30, about 19 to about 28, about 19 to about 26, about 19 to about 24, about 20 to about 30, about 20 to about 27, about 20 to about 24, about 21 to about 30, about 21 to about 27, about 21 to about 25, about 22 to about 30, about 22 to about 28, about 22 to about 26, about 23 to about 30, about 23 to about 28, about 23 to about 24, about 24 to about 30, about 24 to about 28, about 24 to about 26, about 25 to about 30, about 25 to about 27, or about 26 to about 30% by weight).

In some embodiments the calcium content in the washed curd is about 40, 41, 42, 43, 44, 45, 46, 47, 48, 49 or 50 mMol Ca/100 g casein, and useful ranges may be selected between any of these values (for example, about 40 to about 50, about 40 to about 48, about 40 to about 47, about 40 to about 43, about 41 to about 50, about 41 to about 49, about 41 to about 47, about 41 to about 45, about 42 to about 50, about 42 to about 47, about 42 to about 46, about 43 to about 50, about 43 to about 48, about 44 to about 50, about 44 to about 48, about 44 to about 46, about 45 to about 50, about 45 to about 48, about 45 to about 47, about 46 to about 50, about 46 to about 48, or about 48 to about 50 mMol Ca/100 g casein).

The cheese curd is particularised, preferably through the use of a grinder. Preferably the particle size of the curd particles is 2, 3, 4, 5, 6, 7, 8, 9, 10, 11, 12, 13, 14, 15, 16, 17, 18, 19 or 20 cm, and useful ranges may be selected between any of these values.

The particularised cheese curd is mixed with various ingredients. Typically this occurs in a blend tank. Ingredients include a lipid source to achieve a desired lipid content. As stated previously, the lipid source can be selected from cream, high fat cream, anhydrous milk fat, ghee, unsalted butter and salted butter. The source of this lipid can be the cream that is separated from the milk protein source, where that source included a lipid content.

Other ingredients for addition to the blend tank include salt and other GRAS ingredients. The GRAS ingredients can include
 vi) dairy proteins including nonfat dry milk, skim milk powder, buttermilk powder, milk protein concentrate, caseins, caseinates, dry sweet whey, whey protein concentrate, whey protein isolate, and total milk protein,
 vii) colorants,
 viii) flavours,
 ix) starches,
 x) gums and/or hydrocolloids,
 xi) salt,
 xii) enzymes,
 xiii) emulsifiers,
 xiv) sweetening agents, such as lactose, and
 xv) any combination of two or more of (i) to (viii) above.

In one embodiment the monovalent content is adjusted through the addition of NaCl or KCl to the curd, blend tank, cheese mass or any combination thereof. Preferably NaCl is used.

In one embodiment the mixture is adjusted to a sodium content of 100, 120, 140, 160, 180, 200, 220, 240 or 250 mMol Na/100 g Casein, and useful ranges may be selected between any of these values, for example, (about 100 to about 250, about 100 to about 240, about 100 to about 200, about 100 to about 160, about 100 to about 120, about 120 to about 250, about 120 to about 230, about 120 to about 200, about 120 to about 160, about 140 to about 250, about 140 to about 180, about 160 to about 250, about 160 to about 240, about 160 to about 180, about 180 to about 250, about 180 to about 200, about 200 to about 250 mMol Na/100 g Casein).

Addition of Whey Protein Gel Particles

In one embodiment the process includes the addition of whey protein gel particles. The use of whey protein gel particles can assist the water holding ability of the pasta filata cheese.

The whey protein gel particle can be prepared from a whey protein solution. For example, a whey protein (WP) solution of about 10 to about 30% protein content is obtained either by reconstituting of whey protein powder in water or ultrafiltration of fresh whey stream. The whey protein solution is adjusted to a pH of about 6 to about 8 by adding dilute alkali and/or acid, such as NaOH and/or HCl.

In some embodiments the whey protein solution is combined with the lipid source (for addition into the blend tank). In some embodiments the lipid-whey mixture is an emulsion that is either mixed with a high speed mixer or homogenised at relatively low pressure, for example up to about 200 bar. Preferably the temperature is maintained at about 50° C., to avoid fat crystallisation.

In some embodiments the lipid source is a milk lipid. Preferably the milk lipid is selected from cream (which typically has a fat content of about 30% by weight), high fat cream (which typically has a fat content of about 75% by weight), or anhydrous milk fat (which typically has a fat content of about 99.8% by weight).

In some embodiments the emulsion is prepared in absence of added emulsifier.

Typically any other milk product can be added, such as GRAS ingredients.

In some embodiments the lipid combined with the whey protein solution accounts for at least 70, 75, 80, 85, 90, 95 or 100% of the total fat in the final cheese product, and useful ranges may be selected between any of these values.

The mixture of whey and lipid is heated to at least 65, 70, 75, 80 or 85° C., for at least about 10, 15, 20, 25, 30, 35 or 40 seconds, and useful ranges may be selected between any of these values. This heat step allows the protein to denature and form a gel. Preferably, the heating takes place under dynamic conditions, providing shear to break up the protein gel into smaller particles.

In some embodiments the heated emulsion of whey protein and lipid is cooled to low temperatures (e.g. 4±2° C.), allowing refrigerated storage before later usage.

In alternate embodiments the heated emulsion is added directly, as a hot ingredient to the mixture of ingredients for making mozzarella or pasta filata cheese.

The amount of heated emulsion required depends on the target moisture content of the final cheese. Those skilled in the art would understand that whey protein gel particles can bind large amounts of water. For example, if the original whey protein solution contains 15% protein, the moisture content of the gel particles would be at least about 80%. Therefore, the amount of emulsion required depends on the target moisture and fat content in the final product.

Mixture Cooking and Stretching

The mixture is then introduced into a cooker and cooked at a temperature of 65, 70, 75, 80, 85 or 90° C., and useful ranges may be selected between any of these values (for example, about 65 to about 90, about 65 to about 85, about 65 to about 70, about 70 to about 90, about 70 to about 85, about 70 to about 75, about 75 to about 90, about 75 to about 80, about 80 to about 90, about 80 to about 85, about 85 to about 90° C.).

Various types of cheese cookers and scraped surface heat exchangers can be used. In some embodiments the cooker includes direct steam injection. In some embodiments this step is used to control the moisture content of the final pasta filata cheese product.

The heated cheese mass may be subjected to mechanical stretching and kneading to produce a stretched curd pasta filata cheese product.

In some embodiments the cooked and stretched pasta filata can be cast as a sheet for immediate or later shredding. Typically the casting device cools the cheese to form a continuous sheet or ribbon.

In some embodiments the cooked pasta filata is extruded at a low temperature and then cut.

In some embodiments, for example where there is a storage requirement the pasta filata can be produced as blocks and frozen. The blocks can be processed to shredding when desired.

In some embodiments the frozen or chilled pasta filata is shredded to produce individual shredded cheese particles having a shred size of about 1.5 to 4.5 mm±1.5 mm depth and width, and about 3 to about 30 mm in length.

In some embodiments an anticaking agent is added to the shredded cheese particles. In some embodiments the anticaking agent is selected from microcrystalline cellulose (amount limited by GMP), powdered cellulose (amount limited by GMP), silicon-dioxide, amorphous (amount to 10,000 mg/kg), magnesium silicate, synthetic (amount to 10,000 mg/kg), sodium aluminosilicate (amount to 10,000 mg/kg), calcium aluminium silicate (amount to 10,000 mg/kg), and aluminum silicate (amount to 10,000 mg/kg).

In some embodiments the shredded cheese particles are immediately frozen to produce Individually Quick Frozen (IQF) shredded particles.

In other embodiments the cooked cheese is packaged as a string cheese, pasta filata cheese, Bocconcini or in a bulk format and cooled to refrigeration temperatures.

EXAMPLES

1. High Moisture Mozzarella and Pasta Filata Cheese

Whole milk was separated into cream (approximately 40% fat) and skim milk fractions, and each fraction pasteurized at standard temperatures by standard procedures. The cream was stored at refrigeration temperatures overnight. Meanwhile, the temperature of approximately 1800 L of pasteurized skim milk was adjusted to 10° C. 100 ml of Fromase XL-750 (DSM) microbial coagulant thoroughly blended into the tempered skim milk, and the renneted skim milk quiescently held for approximately 6 hr. The treated skim milk was then acidified by the rapid addition of a sufficient amount of dilute sulphuric acid using an inline static mixer to reduce the pH to 5.4, while maintaining the temperature at 10° C. The prepared skim milk was then heated with direct steam injection to 43° C. and held for 50 seconds in a holding tube to coagulate and cook the casein, forming cheese curds. The whey was drained and the curd washed with acidified water (pH 2.6) at a rate of 8.3 L wash water per kg curd. A decanting separator removed the curd from the wash water to produce a low fat cheese curd base with a target calcium content of 165 mMol Ca/kg. The cheese curd was then milled.

The cream was removed from refrigerated storage, heated to 50° C. in a plate heat exchanger using standard procedures, and then processed with the appropriate separator to produce high fat (or plastic) cream (approximately 79 to 80% fat). Then 10.14 kg milled low fat cheese curd base, 5.822 kg of high fat cream, and 0.57 kg of salt (sodium chloride) were added together in a Blentech (Rohnert Park, Calif.) twin-screw, laydown process cheese cooker (25 kg total capacity). The combined ingredients were initially blended together for 1 min, with the screw speeds set to 50 RPM, and the temperature averaging 25° c. Then 6.72 kg of blend water was added to the mixture, and the blending continued with screw speeds of 50 RPM and an average temperature of 25° C. The screw speeds were then increased to 90 RPM and cooking commenced with direct steam injection. The rate of steam injection was kept relatively constant for 3.5 minutes, then turned off for another 3.5 min. The maximum observed temperatures was 68° C. The screw speeds were increased to 150 RPM when the blend temperature reached 50° C. and decreased to 50 RPM after the steam injection was turned off. Blend formulation calculations were based upon a presumption that direct steam injection would add an additional 1.75 kg of water to the finished cheese as steam condensate. Therefore, the trial formulation should produce approximately 25 kg molten cheese blend.

The molten blend was collected and introduced to a prepared chillroll which cooled the blend to produce a sheet of chilled, gelled mozzarella. Chilled mozzarella sheets were rapidly frozen in a low temperature freezer, and the frozen cheese subsequently shredded, and stored frozen until used for baking upon pizzas.

Table 1 shows the calculated and actual mozzarella compositions.

TABLE 1

Formulated target and actual compositions of high moisture mozzarella cheese

| Component | Calculated % | Actual % |
|---|---|---|
| Moisture | 60.01 | 60.4 |
| Total solids | 39.99 | 39.6 |
| Fat | 18.79 | 18.6 |
| FDM | 47.0 | 47.0 |
| Total protein | 17.58 | 18.06 |
| Casein | 17.19 | 18.02 |
| Other solids (lactose etc.) | 1.34 | 0.66 |
| Salt | 2.28 | 2.28 |
| pH | 5.7 | 5.7 |

| | mMol/100 g casein | mMol/100 g casein |
|---|---|---|
| Calcium | 37.7 | 38.1 |
| Magnesium | 4.9 | 4.6 |
| Manganese | Trace | Undetectable |
| Zinc | Trace | Undetectable |
| Sodium | 227.0 | 216.5 |
| Potassium | 3.0 | 2.8 |
| Na/K | 56.5:1 | 56.6:1 |
| Total monovalent cations | 230.0 | 219.3 |
| Total divalent cations | 42.6 | 42.7 |
| Total cations | 272.6 | 262.0 |

The frozen shreds of mozzarella were tested by being baked upon a pizza 5 days after manufacture to evaluate functionality. Initially, 300 g of the frozen IQF mozzarella were placed upon a circular pizza base with a diameter of 12 in. (30.5 cm), previously prepared by the addition of 90 g of sauce. The prepared pizza was baked at 250° C. for 7 min in a standard impinger oven. The functional performance of the mozzarella made by the novel process meet, or exceeded the required functionality for blister size, melt, oil off, stretch, and tenderness during chewing.

2. Gelled Whey Protein Particles

Gelled whey protein particles were produced as an emulsion by using overhead stirrer to initially mix 40 parts WPC solution (20% protein) with 60 parts high fat cream (80% fat) at 55° C. This mixture was then processed using a high speed mixer (UltraTurrax, IKA Model T25 D S2, Global Science, Germany) at 15,000 RPM for 2 minutes at a temperature of about 50° C.

The prepared mixture was subsequently preheated in a water bath at 55° C. for approximately 20 min and then pumped through a copper coil submerged in a water bath by a peristaltic pump (Easy Load MasterFlex, Model 7518-10, Cole-Palmer Instrument Company, Barrington, Ill., USA. The water bath temperature was maintained at 85±1° C., so that a 10 sec. residence time passing through the coil heated the mixture to a final temperature of approximately 80° C. The prepared mixture was allowed to cool at room temperature to form gelled whey protein particles before storage at 4° C.

The gelled whey protein particles were then used to produce a variety of high moisture mozzarella cheeses with low fat curd, high fat cream, reverse osmosis water and sodium chloride (NaCl) using an Rapid Visco Analyser (RVA, Newport Scientific Pty Ltd, Warriewood, NSW, Australia).

The control, or model mozzarella cheese composition consisted of 21% protein, 23% fat, 53% moisture, 1.4% NaCl, 80 mmol/kg calcium and pH 5.4. The ingredients were weighed and added into a RVA canister. Total sample size was 30 g consisting of high fat cream (~6 g), low fat curd (~15 g), water (~8.6 g) and NaCl (420 mg). When the trial formulations included the gelled whey protein particles the amounts of all other ingredients proportionally were reduced to balance emulsion addition.

The propeller-shaped agitator was then inserted into the RAV canister and the canister placed into the RVA. The temperature was maintained at 25° C. for 2 min while the continuously increasing the mixing speed from 0 to 800 rpm. The temperature was then increased from 25 to 70° C. within 2 min, and held at 70° C. for 6 min. The sample was removed from the canister, the molten contents poured onto a sheet of process cheese packaging film, and rolled between appropriate spacers to product a 2 mm thick slice upon cooling.

Table 2 shows the calculated composition and actual finished moisture content of the model mozzarella formulation produced with 0 to 30 percent volume fraction ($\phi$) addition of gelled whey protein particles.

TABLE 2

Target and measured moisture contents of model mozzarella cheeses produced with 0 to 30 percent added volume fractions ($\Phi$) of gelled whey protein particles

| $\Phi$ (%) | Casein (%) | Whey protein (%) | Total protein | Fat (%) | Moisture (%) | *Moisture (%) |
|---|---|---|---|---|---|---|
| 0 | 21 | 0 | 21 | 23 | 54 | 53.1 ± 0.3 |
| 5 | 20 | 1 | 21 | 22 | 56 | 55.7 ± 0.5 |
| 10 | 19 | 2 | 21 | 20 | 57 | 57.1 ± 0.4 |
| 15 | 17 | 3 | 21 | 19 | 58 | 58.3 ± 0.3 |
| 20 | 16 | 4 | 21 | 18 | 59 | 59.3 ± 0.2 |
| 25 | 15 | 5 | 21 | 17 | 60 | 61.1 ± 0.3 |
| 30 | 14 | 6 | 20 | 16 | 62 | 61.8 ± 0.2 |

*= measured whey moisture contents (error = one s.d., n = 4)

The cheese samples containing the gelled whey protein particles were described by a four trained cheese experts as consistent in texture with good water holding capacity.

3. Whey Protein Gel Particle

Fresh acid whey was processed by ultrafiltration to produce a retentate in which the whey proteins constituted 25% of the total solids. A variety of whey protein gel particles were prepared by mixing whey protein concentrate with high fat cream (79% fat) in ratios of 30:70 (E1), 35:65 (E2) and 40:60 (E3). The prepared blends each consisted of about 100 kg. Each mixture was then separately processed by mixing with an Ultraturrax at 8000 rev/min and 55° C. for 10 min. The mixtures were separately homogenised at 200 bar, and then heated at 85° C. for 24 s. The heat treatment was performed using a shell-and-tube heat exchanger in which the product was fed into a tube (coil) within a heating chamber containing steam. The heated mixtures were cooled to room temperature to form gelled whey particles. The particles were then cooled to 4° C. for storage before use as ingredients in making model mozzarella cheeses.

Table 3 shows the composition of the various gelled whey protein particles emulsions.

TABLE 3

Compositional analyses of gelled whey protein prepared at three different ratios of WPC to high fat cream

| Gelled Whey Protein Particle Trial | Protein (%) | Fat (%) | Moisture (%) | WPC:High fat cream |
|---|---|---|---|---|
| E1 | 5.23 | 52.20 | 42.10 | 30:70 |
| E2 | 6.70 | 52.40 | 39.00 | 35:65 |
| E3 | 7.78 | 52.41 | 41.40 | 40:60 |

The model mozzarella cheeses were made using a model mixer cooker. The formulations for these cheeses were modifications of a standard formulation, with ~53% moisture, ~20-23% protein and ~23% fat. The gelled whey protein particles were usually tested for their ability to hold moisture in those cheeses. Addition of the gelled whey protein particles usually produced mozzarella with decreased fat, slightly decreased protein, and an increase in moisture content. The amount of gelled whey protein particles added in a specific batch was usually determined by setting the target moisture. Then minimal alterations were made to amounts of the other added ingredients, as described in Example 2 above.

TABLE 4

Compositional analyses of mozzarella cheese made with gelled whey protein particles

| Cheese Sample | Protein (%) | Fat (%) | Moisture (%) | Moisture Target (%) |
|---|---|---|---|---|
| Control 1 | 21.1 | 23.5 | 54.1 | 53.00 |
| Control 2 | 19.0 | 18.7 | 59.7 | 60.00 |
| high moisture mozzarella cheese-E1 | 17.6 | 22.0 | 57.5 | 59.46 |
| high moisture mozzarella cheese-E2 | 18.1 | 20.0 | 59.6 | 59.76 |
| high moisture mozzarella cheese-E3 | 17.8 | 18.0 | 60.5 | 60.05 |

All high moisture mozzarella cheeses had a pH of 5.4 and a salt content of 1.4%.

Control 1 was formulated to produce 53% moisture, while Control 2 was formulated to produce 60% moisture as added water. The Control 2 formulation produced poor cheese with inconsistent texture and extensive free serum. The poor quality cause the cheese produced with the Control 2 formulation to be withdrawn from the trial.

The high moisture mozzarella cheeses were moulded into sheets, shredded and stored at ~18° C. until use. The shreds were removed from the freezer 2 days before use and then stored at 4° C. Each was then applied on pizza for evaluation as described above.

The assessment of these pizzas showed that there were no significant differences, with respect to appearance and melt characteristics. The cheeses with added emulsions had good texture and mouth feel and flavour.

These examples demonstrate that the use of gelled whey protein particles successfully produced high moisture mozzarella cheese for pizza applications.

4. Comparative Examples

Additional trials demonstrating the manufacture of mozzarella and pasta filata cheese with the compositions were compared to cheeses with traditional and alternative compositions. This set of trials evaluated cheeses made to the compositions of the invention, cheeses made to compositions outside the parameters of the invention, and standard reference cheese samples.

Trial Parameters of Illustrative Cheeses of the Invention

Cheeses produced in the trials further evaluating compositions providing the desired functionality were made to the following parameters:
a) moisture contents of either 60, 63, or 65%,
b) texturized whey protein contents of either 0, or 4%,
c) salt contents of either 1.50, 1.65, or 1.85%,
d) divalent cation contents of approximately 35 to 45 mMol/100 g Casein, and
e) monovalent cation contents of approximately 140 to 190 mMol/100 g Casein.

The Fat-in-Dry-Matter (FDM) was held constant at 47.5%, where:

FDM=(% Fat/% Total Solids)*100

Therefore, the absolute cheese fat content varied as required to maintain the FDM with changes to the moisture/total solids content.

The protein content varied as required to complement the moisture/total solids, fat, and salt contents, allowing for the residual milk salt and incidental carbohydrate (mostly organic and primarily lactic acids, and trace amounts of lactose).

The divalent cation content was primarily controlled during cheese curd manufacture by using procedures to either promote or limit the removal of divalent cations (mostly Ca and Mg but also incidental or trace amounts of Zn and Mn).

The monovalent cation content was mostly controlled by regulating the added salt (e.g. the sodium chloride or possibly potassium chloride) content, which adjusted the sodium content as required. Although potassium chloride may also be added to adjust the monovalent cation content, potassium chloride was not added in these trials. Table 5 shows the calculated compositions of the trial cheeses illustrating the invention. These cheeses are identified by the letters A through H, noting the variation in parameters evaluated in each trial.

monovalent cations content of 80 to about 125; and >240 mMol/100 g Casein

The FDM again was held constant at 47.5%, and the absolute cheese fat content varied as required to maintain the FDM with changes to the moisture/total solids content. The protein content varied as required to complement the moisture/total solids, fat, and salt contents, allowing for the

TABLE 5

Calculated Composition of Inventive Trial Cheeses

|  | A | B | C | D | E | F | G | H |
|---|---|---|---|---|---|---|---|---|
|  |  |  |  | -%- |  |  |  |  |
| Texurized Whey Component | 0 | 4 | 0 | 4 | 0 | 4 | 0 | 4 |
| Moisture | 60 | 60 | 60 | 60 | 63 | 63 | 65 | 65 |
| Total Solids | 40 | 40 | 40 | 40 | 37 | 37 | 35 | 35 |
| FDM[1] | 47.5 | 47.5 | 47.5 | 47.5 | 47.5 | 47.5 | 47.5 | 47.5 |
| Fat | 19 | 19 | 19 | 19 | 17.6 | 17.6 | 16.6 | 16.6 |
| Total Protein | 18.3 | 18.3 | 18 | 18 | 16.6 | 16.6 | 15.7 | 15.7 |
| Casein | 18.25 | 18.0 | 17.95 | 17.7 | 16.55 | 16.3 | 15.65 | 15.25 |
| WP/NPN[2] | 0.05 | 0.3 | 0.05 | 0.3 | 0.05 | 0.3 | 0.05 | 0.35 |
| CHO[3]/Ash | 1.2 | 1.2 | 1.15 | 1.15 | 1.15 | 1.15 | 1.05 | 1.05 |
| Salt | 1.5 | 1.5 | 1.85 | 1.85 | 1.65 | 1.65 | 1.65 | 1.65 |
|  |  |  |  | mMol/100 g Cheese[4] |  |  |  |  |
| Ca | 6.82 | 6.78 | 6.67 | 6.66 | 6.20 | 6.17 | 5.85 | 5.79 |
| Mg | 0.37 | 0.37 | 0.36 | 0.36 | 0.33 | 0.33 | 0.31 | 0.31 |
| Mn |  |  |  |  |  |  |  |  |
| Zn |  |  |  |  |  |  |  |  |
| Na | 26.02 | 26.09 | 32.11 | 32.15 | 28.56 | 28.64 | 28.55 | 28.63 |
| K | 0.15 | 0.16 | 0.15 | 0.16 | 0.14 | 0.15 | 0.13 | 0.14 |
| TMVCat | 26.17 | 26.25 | 32.26 | 32.31 | 28.70 | 28.79 | 28.68 | 28.77 |
| TDVCat | 7.19 | 7.15 | 7.03 | 7.02 | 6.53 | 6.47 | 6.16 | 6.10 |
| Total Cat | 33.36 | 33.40 | 39.29 | 39.33 | 35.23 | 35.26 | 34.84 | 34.87 |
|  |  |  |  | mMol/100 g Casein |  |  |  |  |
| Ca | 37.37 | 37.69 | 37.18 | 37.73 | 37.45 | 37.86 | 37.37 | 37.97 |
| Mg | 2.01 | 2.03 | 1.99 | 2.03 | 2.01 | 2.04 | 2.00 | 2.05 |
| Mn |  |  |  |  |  |  |  |  |
| Zn |  |  |  |  |  |  |  |  |
| Na | 142.60 | 144.97 | 178.89 | 182.15 | 172.60 | 175.72 | 182.41 | 187.71 |
| K | 0.84 | 0.88 | 0.85 | 0.88 | 0.83 | 0.89 | 0.83 | 0.89 |
| TMVCat | 143.44 | 145.85 | 179.74 | 183.03 | 173.43 | 176.62 | 183.25 | 188.60 |
| TDVCat | 39.38 | 39.72 | 39.18 | 39.76 | 39.46 | 39.90 | 39.37 | 40.03 |
| Total Cat | 182.91 | 185.57 | 218.92 | 222.79 | 212.89 | 216.52 | 222.61 | 228.62 |

[1] FDM = Fat-in-Dry-Matter; or = $\left(\frac{\% \text{ fat}}{\% \text{ Total Solids}}\right) * 100$

[2] WP/NPN = Sum of the % whey protein + nonprotein nitrogen\

[3] CHO/Ash = Sum of the carbohydrate (mostly lactose and organic acids) + ash

[4] Abbreviations
Ca = calcium
Mg = magnesium
Mn = manganese
Zn = zinc
Na = sodium
K = potassium
TMVCat = total monovalent cations or the sum of the Na + K
DMVCat = total divalent cations or the sum of the Ca + Mg + Mn + Zn
Total Cat = the total cation content or the sum of the TMVCat + DMVCat Trial Parameters of Comparative Cheeses Made to Parameters Outside of the Invention Cheeses produced in the comparative trials evaluated compositions outside the cation parameters able used in the inventive cheeses to provide the desired functionality. These cheeses were made to the following parameters:
  moisture contents of either≈61.5±≈0.35, 62.0, 63, and 65%,
  salt contents of either≈0.8, 1.25, or 2.25/2.30%;
  divalent cation contents of 25 to >50 mMol/100 g Casein, and residual milk salt and incidental carbohydrate (mostly organic and primarily lactic acids, and trace amounts of lactose). Finally, no texturised whey protein ingredient was included in any of the comparative samples.

The divalent cation content was again primarily controlled during cheese curd manufacture, using procedures to either promote or limit the removal of divalent cations (mostly Ca and Mg but also includes trace amounts of Zn and Mn).

The monovalent cation content was mostly controlled by regulating the added salt (e.g. the sodium chloride) content, which adjusted the sodium content as required. Table 6 shows the calculated compositions of the trial cheeses illustrating the invention. These cheeses are identified by the letters A1 and A6, and B1 through B3 (derived from examples 1 to 3 of WO 2003/069982). The table shows the compositional variation evaluated in each trial.

TABLE 6

Calculated Composition of Non-inventive Comparison Trial Samples

| | A1 | A6 | B1 | B2 | B3 |
|---|---|---|---|---|---|
| Tex Whey Component | 0 | 0 | 0 | 0 | 0 |
| | -%- | | | | |
| Moisture | 63 | 65 | 62.24 | 61.85 | 61.24 |
| Total Solids | 37 | 35 | 37.76 | 38.15 | 38.76 |
| FDM | 47.5 | 47.4 | 47.57 | 47.48 | 47.56 |
| Fat | 17.6 | 16.6 | 17.96 | 18.11 | 18.43 |
| Total Protein | 17.8 | 14.9 | 17.13 | 17.13 | 16.65 |
| Casein | 17.7 | 14.6 | 17.05 | 17.05 | 16.57 |
| WP/NPN | 0.01 | 0.3 | 0.08 | 0.08 | 0.08 |
| CHO/Ash | 0.8 | 1.25 | 1.41 | 1.41 | 1.38 |
| Salt | 0.8 | 2.25 | 1.26 | 1.5 | 2.3 |
| mMol/100 g cheese | | | | | |
| Ca | 4.19 | 7.30 | 9.12 | 9.11 | 8.87 |
| Mg | 0.27 | 0.42 | 0.53 | 0.53 | 0.51 |
| Mn | | | | | |
| Zn | | | | | |
| Na | 14.02 | 38.96 | 21.92 | 26.02 | 39.72 |
| K | 0.14 | 0.14 | 0.17 | 0.17 | 0.16 |
| TMVCat | 14.16 | 39.10 | 22.09 | 26.18 | 39.88 |
| TDVCat | 4.46 | 7.72 | 9.65 | 9.65 | 9.38 |
| Total Cat | 18.62 | 46.82 | 31.74 | 35.83 | 49.26 |

TABLE 6-continued

Calculated Composition of Non-inventive Comparison Trial Samples

| | A1 | A6 | B1 | B2 | B3 |
|---|---|---|---|---|---|
| Tex Whey Component | 0 | 0 | 0 | 0 | 0 |
| | -%- | | | | |
| mMol/100 g Casein | | | | | |
| Ca | 23.67 | 50.00 | 53.49 | 53.43 | 53.53 |
| Mg | 1.53 | 2.88 | 3.11 | 3.11 | 3.08 |
| Mn | Trace | Trace | Trace | Trace | Trace |
| Zn | Trace | Trace | Trace | Trace | Trace |
| Na | 79.21 | 266.85 | 128.56 | 152.61 | 239.71 |
| aK | 0.79 | 0.96 | 1.00 | 1.00 | 0.97 |
| TMVCat | 80.00 | 267.81 | 129.56 | 153.61 | 240.68 |
| TDVCat | 25.20 | 52.88 | 56.60 | 56.54 | 56.61 |
| Total Cat | 79.2 | 220.1 | 128.6 | 152.6 | 239.7 |

[1] $FDM = \text{Fat-in-Dry-Matter; or} = \left(\frac{\% \text{ fat}}{\% \text{ Total Solids}}\right) * 100$
[2] WP/NPN = Sum of the % whey protein + nonprotein nitrogen\
[3] CHO/Ash = Sum of the carbohydrate (mostly lactose and organic acids) + ash
[4] Abbreviations
Ca = calcium
Mg = magnesium
Mn = manganese
Zn = zinc
Na = sodium
K = potassium
TMVCat = total monovalent cations or the sum of the Na + K
DMVCat = total divalent cations or the sum of the Ca + Mg + Mn + Zn
Total Cat = the total cation content or the sum of the TMVCat + DMVCat Standard Reference Composition Table 7 provides the composition of standard Mozzarella and related cheeses for reference and comparison. Cheeses were not made to these compositions in these trials.

TABLE 7

The composition of Reference Comparison Samples:

| Component | Mozzarella[1] | Low Moisture[2] | Part Skim[3] | Low Moisture\Part Skim[4] | Mozzarella[5] | Mozzarella[6] |
|---|---|---|---|---|---|---|
| | | | | -%- | | |
| Moisture | 54.14 | 48.38 | 53.78 | 48.57 | 52 | 48.2 |
| Total Solids | 45.86 | 51.62 | 46.22 | 51.43 | 48 | 51.8 |
| FDM[7] | 47.1 | 47.73 | 34.44 | 33.29 | 37.5 | 40.7 |
| Fat | 21.6 | 24.6 | 15.9 | 17.1 | 18 | 21.1 |
| Total Protein | 19.4 | 21.6 | 24.25 | 27.5 | 28 | 25.3 |
| Casein[8] | 19.4 | 21.6 | 24.25 | 27.5 | 27.8 | 25.3 |
| WP/NPN[9] | Trace | Trace | Trace | Trace | 0.02 | Trace |
| CHO/Ash[10] | 4.86 | 5.42 | 6.07 | 6.83 | 0.9 | 4.05 |
| Salt | NA | NA | NA | NA | 1.1 | 1.35 |
| pH | NA | NA | NA | NA | NA | 5.75 |
| mMol/100 g Cheese[11] | | | | | | |
| Ca | 12.9 | 14.35 | 16.12 | 18.24 | 17.7 | 17.82 |
| Mg | 0.78 | 0.86 | 0.95 | 1.07 | | 0.93 |
| Mn | | | | | | |
| Zn | 0.03 | 0.04 | 0.04 | 0.05 | | |
| Na | 16.22 | 18.05 | 20.27 | 22.97 | 23.1 | 22.88 |
| K | 0.49 | 0.54 | 0.59 | 0.66 | 0.58 | 0.58 |
| TMVCat | 16.71 | 18.59 | 20.86 | 23.63 | 23.6 | 23.5 |
| TDVCat | 13.71 | 15.25 | 17.11 | 19.36 | 17.7 | 18.8 |
| Total Cat | 30.42 | 33.84 | 37.97 | 42.99 | 41.3 | 42.2 |
| mMol /100 g Casein | | | | | | |
| Ca | 66.5 | 66.4 | 66.5 | 66.3 | 63.7 | 70.4 |
| Mg | 4.0 | 4.0 | 3.9 | 3.9 | 0.0 | 3.7 |
| Mn | | | | | | |
| Zn | 0.2 | 0.2 | 0.2 | 0.2 | | |
| Na | 83.6 | 83.6 | 83.6 | 83.5 | 82.9 | 90.4 |
| K | 2.5 | 2.5 | 2.4 | 2.4 | 2.1 | 2.3 |

TABLE 7-continued

The composition of Reference Comparison Samples:

| Component | Mozzarella[1] | Low Moisture[2] | Part Skim[3] | Low Moisture\Part Skim[4] -%- | Mozzarella[5] | Mozzarella[6] |
|---|---|---|---|---|---|---|
| TMVCat | 86.1 | 86.1 | 86.0 | 85.9 | 85.0 | 92.7 |
| TDVCat | 70.7 | 70.6 | 70.6 | 70.4 | 63.7 | 74.1 |
| Total Cat | 156.8 | 156.7 | 156.6 | 156.3 | 148.7 | 166.8 |
| TP | 61.7 | 61.6 | 61.6 | 61.5 | | |

[1-4]Source: Posati, L. P., and Orr, M. O. 1976. Compostion of Foods: Dairy and Egg Products. Agriculture Handbook No. 8-1, United States Department of Agriculture., Washington, D.C.
[1]Cheese, Mozzarella 01-026,
[2]Cheese, Mozzarella, Low Moisture 01-027
[3]Cheese, Mozzarella, Part Skim 01-028,
[4]Cheese, Mozzarella, Low Moisture Part Skim 01-029,
See also
USDA Nutrient Database for Standard Reference, SR14.http://nal. usda. gov/fnic/cgi-bin/nut_search.pl
[5]Visser, F., I. Gray, and M. Williams. 1991. Composition of New Zealand Foods. 3 Dairy Products. NZDB and DSIR.
[6]Fonterra. Mozzrella (109829). PB 763 Version 3.0713. Fonterra Co-operative Group, Ltd. Auckland, NEW ZEALAND

[7]FDM = Fat-in-Dry-Matter; or = $\left(\dfrac{\% \text{ fat}}{\% \text{ Total Solids}}\right) * 100$

[8]Casein values are estimated.
[9]WP/NPN = Estimated sum of the % whey protein + nonprotein nitrogen.
[10]CHO/Ash = Sum of the carbohydrate (mostly lactose and organic acids) + ash. Carbohydrate values usually calculated by difference.
[11]Abbreviations
Ca = calcium
Mg = magnesium
Mn = manganese
Zn = zinc
Na = sodium
K = potassium
TMVCat = total monovalent cations or the sum of the Na + K
DMVCat = total divalent cations or the sum of the Ca + Mg + Mn + Zn
Total Cat = the total cation content or the sum of the TMVCat + DMVCat

Manufacture of Inventive and Comparative Cheese Samples

Milk Receipt and Treatment

Raw whole milk was received and separated into cream (≈40% fat) and skim milk. Each fraction was separately pasteurized at standard temperatures by the high-temperature, short time procedure using plate heat exchangers operated by standard procedures. The cream was cooled and stored at refrigeration temperatures until use.

Skim Mozzarella Cheese Curd Preparation

Cheese curd for both the inventive and comparative trials was made by the method of Johnson et al. (WO 2003/069982A1), although any cheese manufacturing procedure producing the desired mono and divalent cation content is acceptable. Approximately 1800 L of pasteurized skim milk was transferred to a vat and set with Fromase XL-750 microbial coagulant (DSM, Holland). The resulting coagulum was cut, cooked, separated from the whey, washed with acidified water (pH 2.6) at a rate of 8.3 L wash water per kg curd, and then milled to produce a low fat cheese curd base with a target calcium content of≈165 mMol Ca/kg Mozzarella curd.

High Fat Cream Preparation

The cream was removed from refrigerated storage and heated to 50° C. using a plate heat exchanger. The tempered cream was then processed with an appropriate separator to produce high fat (or plastic) cream with≈80% fat.

Whey Protein Gel or Texturized Whey Protein Preparation

Whey protein gel or texturized whey protein particles were prepared as described in example 3, Emulsion E2. The composition of the finished particles was moisture 39.23%, fat 52.55%, total protein 6.70%, Casein 0.4%, whey protein/NPN 6.3%, CHO/ash 1.52% calcium 0.08%, sodium 0.06%, and potassium 0.01%. The amounts of magnesium, manganese, and zinc in the prepared particles were below detection levels.

Cheese Manufacture

All cheeses were made by combining calculated amounts of skim Mozzarella cheese curd, high fat cream, blend water, and salt (sodium chloride) in a Blentech (Rohnert Park, Calif.) twin-screw, laydown process cheese cooker. The ingredients were initially blended together for 10 min., with a screw speed of 50 rpm, and an approximate temperature of 25° C. The screw speeds were then increased to 90 RPM and cooking commenced with direct steam injection to increase the blend temperature to 50° C. in 5 min. The screw speeds were increased to 150 RPM and steam injection continued for another 5 min., increasing the blend temperature to 68° C. Steam injection then ceased and the blend mixed at the final cooking temperature of 68° C., initially with a screw speed of 150 RMP for 5 min., and then at 50 RPM for a final 5 min. Direct steam injection was assumed to add additional water as steam condensate, allowing the trial formulation to produce approximately 25 kg molten cheese blend.

If the trial produced a uniform, successfully emulsified molten cheese mass without free moisture or serum, then the molten blend was collected and cast on a cooled chillroll which to produce a sheet of chilled, gelled Mozzarella. The chilled Mozzarella sheets were rapidly frozen in a low temperature freezer, and the frozen cheese subsequently shredded, and stored frozen until used for baking upon pizzas.

Results

Inventive Samples: Cheese Manufacture

Table 8 shows the compositions of all inventive trial samples, as determined by the standard analytical procedures. All inventive trial cheese blends melted acceptably in the cooker to produce strong, stable fat emulsions binding all the fat, and stable casein structures binding the moisture or serum. Therefore, all the inventive trial cheeses were successfully cast into chilled sheets, frozen, and shredded for evaluation upon pizzas. Table 8 shows the compositions of all inventive trial samples, as determined by the standard analytical procedures. Comparison to the Reference sample compositions presented in Table 7 shows that the moisture, monovalent cation, divalent cation, and total cation contents differ greatly from the composition of these components in the inventive samples.

The manufacture of all comparative cheeses completely failed to produce stable melted blends. The heated, molten samples simultaneously generated large amounts of free milk fat and free serum or moisture. The blends produced in these trials could not be cast as chilled sheets and did not provide uniform samples for compositional analysis. Therefore, these blends were immediately discarded.

TABLE 8

Compositions of Inventive Trial Mozzarella Cheeses

| | A | B | C | D | E | F | G | H |
|---|---|---|---|---|---|---|---|---|
| | | | | -%- | | | | |
| Tex Whey Component | 0 | 4 | 0 | 4 | 0 | 4 | 0 | 4 |
| Moisture | 60.3 | 60.4 | 60.2 | 61 | 61.8 | 62.6 | 63.8 | 64.1 |
| Total Solids | 39.7 | 39.6 | 39.8 | 39 | 38.2 | 37.4 | 36.2 | 35.9 |
| FDM | 47.1 | 45.7 | 46.7 | 46.15 | 46.1 | 44.65 | 45.6 | 43.7 |
| Fat | 18.7 | 18.1 | 18.6 | 18 | 17.6 | 16.7 | 16.5 | 15.7 |
| Total Protein | 18.25 | 18.37 | 18.12 | 18.06 | 18.06 | 17.8 | 17.90 | 17.23 |
| Casein | 18.20 | 17.45 | 18.06 | 17.15 | 18.01 | 17.0 | 17.85 | 16.35 |
| WP/NPN | 0.05 | 0.92 | 0.06 | 0.91 | 0.05 | 0.8 | 0.05 | 0.88 |
| CHO/Ash | 1.31 | 1.67 | 1.32 | 1.23 | 0.94 | 1.32 | 0.19 | 1.37 |
| Salt | 1.44 | 1.43 | 1.78 | 1.71 | 1.6 | 1.58 | 1.61 | 1.6 |
| pH | 5.73 | 5.71 | 5.70 | 5.74 | | | | |
| | | | | mMol/100 g Cheese | | | | |
| Ca | 6.86 | 6.86 | 6.89 | 6.76 | 7.34 | 7.14 | 7.29 | 6.81 |
| Mg | 0.41 | 0.42 | 0.41 | 0.42 | 0.41 | 0.40 | 0.40 | 0.39 |
| Mn | 0.001 | 0.001 | 0.001 | 0.001 | 0.001 | 0.001 | 0.001 | 0.001 |
| Zn | 0.043 | 0.038 | 0.037 | 0.041 | 0.035 | 0.034 | 0.036 | 0.036 |
| Na | 23.79 | 23.71 | 29.71 | 24.84 | 25.53 | 25.75 | 26.14 | 25.71 |
| K | 0.33 | 0.46 | 0.33 | 0.42 | 0.28 | 0.38 | 0.27 | 0.37 |
| TMVCat | 24.12 | 24.17 | 30.04 | 25.26 | 25.82 | 26.13 | 26.41 | 26.07 |
| TDVCat | 7.314 | 7.320 | 7.334 | 7.223 | 7.777 | 7.574 | 7.720 | 7.239 |
| Total Cat | 31.44 | 31.49 | 37.37 | 32.48 | 33.59 | 33.71 | 34.13 | 33.31 |
| Total P | 6.78 | 6.94 | 6.91 | 6.62 | 7.20 | 6.94 | 7.14 | 6.72 |
| | | | | mMol/100 g Casein | | | | |
| Ca | 37.70 | 39.32 | 38.13 | 37.44 | 40.73 | 41.98 | 40.82 | 41.66 |
| Mg | 2.25 | 2.40 | 2.27 | 2.32 | 2.25 | 2.37 | 2.23 | 2.39 |
| Mn | 0.003 | 0.003 | 0.003 | 0.003 | 0.003 | 0.003 | 0.003 | 0.003 |
| Zn | 0.234 | 0.216 | 0.207 | 0.229 | 0.200 | 0.200 | 0.200 | 0.220 |
| Na | 130.73 | 135.85 | 164.50 | 137.37 | 141.77 | 151.47 | 146.45 | 157.23 |
| K | 1.81 | 2.64 | 1.81 | 2.32 | 1.58 | 2.26 | 1.50 | 2.24 |
| TMVCat | 132.54 | 138.49 | 166.31 | 139.85 | 143.35 | 153.73 | 147.96 | 159.47 |
| TDVCat | 40.19 | 41.95 | 40.61 | 40.00 | 43.18 | 44.55 | 43.25 | 44.27 |
| Total Cat | 177.2 | 176.8 | 210.7 | 182.6 | 189.6 | 189.7 | 192.7 | 187.5 |
| Total P | 37.25 | 37.78 | 38.26 | 36.66 | 39.98 | 40.83 | 39.97 | 41.07 |

[1] FDM = Fat-in-Dry-Matter; or = $\left(\dfrac{\% \text{ fat}}{\% \text{ Total Solids}}\right) * 100$

[2] WP/NPN = Sum of the % whey protein + nonprotein nitrogen\

[3] CHO/Ash = Sum of the carbohydrate (mostly lactose and organic acids) + ash

[4] Abbreviations

Ca = calcium

Mg = magnesium

Mn = manganese

Zn = zinc

Na = sodium

K = potassium

TMVCat = total monovalent cations or the sum of the Na + K

DMVCat = total divalent cations or the sum of the Ca + Mg + Mn + Zn

Total Cat = the total cation content or the sum of the TMVCat + DMVCat

Baking Analysis on Pizza

The functionality of the frozen shredded Mozzarella was evaluated by baking upon a pizza 5 days after manufacture, using the method described in Example 1. Table 9 shows the pizza baking results for the inventive samples and Table 10 shows the criteria used for the evaluation of the cheeses after being baked upon pizza.

Flavour is evaluated by noting major traits and/or detects including:
saltyness,
acidity,
butteryness,
sharpness of the taste,
oxidised taste,
fishiness, and
cardboard taste.

TABLE 9

Pizza Baking Results of Inventive Trial Mozzarella Cheese Compositions

| Pizza Baking Parameter | A | B | C | D | E | F | G | H |
|---|---|---|---|---|---|---|---|---|
| Blister Coverage | 6 | 5 | 4 | 4 | 6 | 7 | 8 | 5 |
| Blister Size | 4 | 4 | 3 | 4 | 3 | 4 | 4 | 5 |
| Skinning/Excessive Blister | 3 | 3 | 3 | 3 | 1 | 1 | 8 | 1 |
| Blister Colour | 3 | 3 | 3 | 3 | 4 | 4 | 4 | 4 |
| Background Colour | 7 | 7 | 7 | 7 | 4 | 4 | 4 | 4 |
| Oil Off | 4 | 3 | 4 | 2 | 4 | 3 | 2 | 1 |
| Melt Appearance | 5 | 6 | 6 | 7 | 5 | 5 | 5 | 5 |
| Stretch Length | 9 | 10 | 9 | 8 | 7 | 10 | 10 | 10 |
| Stretch Type | 5 | 5 | 5 | 2 | 5 | 5 | 5 | 5 |
| Initial Tenderness | 5 | 5 | 4 | 4 | 5 | 5 | 5 | 4 |
| Tenderness when Chewing | 6 | 4 | 3 | 5 | 5 | 6 | 5 | 4 |
| Flavour | | Sl. Salty | Sl. Buttery Sl. Savory | | Sl. Salty | Sl. Grainy Buttery | Sl Salty Buttery | Sl salty, Sl Free Moisture |

TABLE 10

Pizza Baking Score Definitions

| Pizza Baking Parameter | 1 | 2 | 3 | 4 | 5 | 6 | 7 | 8 | 9 | 10 |
|---|---|---|---|---|---|---|---|---|---|---|
| Blister Coverage | no burnt tips | 0-5% | 5-10% | 10-15% | 15-20% | 20-25% | 25-30% | 30-35% | 35-40% | >40% |
| Blister Size | 0-5 mm | | 5-10 mm | | 10-15 mm | | 15-20 mm | | 20-25 mm | |
| Skinning/Excessive Blister | None | | Slight | | Medium | | Heavy | | Complete crust | |
| Blister Colour | No colour to light brown | | Light brown | | Brown | | Dark brown | | Black/Burnt | |
| Background Colour | Transparent | | Transparent to white | | White to pale yellow | | Pale yellow to yellow | | Yellow to brown | |
| Oil Off | None to slight | | Slight to moderate | | Moderate to heavy | | Heavy to excessive | | Flooded | |
| Melt Appearance | Completely unmelted to moderate unmelt | | Moderate to slight unmelt | | Completely melted | | Slightly soupy | | Soupy | |
| Stretch Length | 0-100 mm | | 100-200 mm | | 200-300 mm | | 300-400 mm | | >400 mm | |
| Stretch Type | Fibrous with lots of top tension | | Fibrous/ribbon-like with top tension | | Thread-like with little top tension | | Fine Strands/soupy | | Fine Strands/Soup/None | |
| Initial Tenderness | Rubbery/Solid-Like | | | | Soft/Tender | | | | Watery/Liquid-Like | |
| Tenderness when chewing | Forms a bolus on chewing, difficult to swallow | | Goes tough, chewy, mealy, dry; difficult to swallow | | Goes slightly tough, chewy, mealy, dry; easier to swallow | | Breaks down on chewing, easy to swallow | | Watery, no substance on chewing | |
| Flavour | | | | | See Footnote | | | | | |

The functionality of the Innovative samples when baked upon a pizza mostly ranged from highly acceptable to excellent. The only potential defect was observed in the "Skinning/Excessive blister" characteristic for sample G. Otherwise, the pizza bake tests showed excellent performance by the innovative samples. In particular, the innovative samples had excellent stretch and frequently were judged as having a desirable "savory" flavour.

We claim:

1. A pasta filata cheese comprising a moisture content of at least about 55% by weight, a solids-non-fat content of up to about 45% by weight, the solids-non-fat comprising at least about 70% by weight protein, the protein comprising at least about 65% by weight casein, and a mineral content comprising
   a) a total divalent cation content of about 25 to about 75 mMol of divalent cations/100 g casein, and
   b) a total monovalent cation content of about 100 to about 250 mMol monovalent cations/100 g casein, and
   c) a total cation content of about 150 to about 300 mMol total cations/100 g casein.

2. A pasta filata cheese comprising a moisture content of at least about 55% by weight, a solids-non-fat content of up to about 45% by weight, the solids-non-fat comprising at least about 70% by weight protein, the protein comprising at least about 65% by weight casein, and a mineral content comprising
   a) less than about 2840 mg calcium per 100 g casein, and
   b) less than about 145 mg magnesium per 100 g casein,
   c) less than about 16.5 µg manganese per 100 g casein,
   d) less than about 13 mg zinc per 100 g casein,
   e) less than about 4.5 g sodium per 100 g casein,
   f) less than about 0.2 g potassium per 100 g casein, and
   g) less than about 4 g phosphate per 100 g casein.

3. A pasta filata cheese of claim 2 comprising up to about 75 mMol of total monovalent cations/100 g casein, the total monovalent cations comprising about 2.5 to about 72.5 mMol sodium ions/100 g casein and about 2.5 to about 35 mMol potassium ions/100 g casein.

4. A pasta filata cheese of claim 3 comprising up to about 250 mMol of total monovalent cations/100 g casein, the total monovalent cations comprising about 175 to about 247.5 mMol sodium ion/100 g casein and about 2.5 to about 75 mMol potassium ion/100 g casein.

5. A pasta filata cheese of claim 4, wherein upon use on a food product, the cooked pasta filata cheese exhibits the characteristics of:
   i) a blister percentage of less than 35%,
   ii) a maximum blister size score of less than 20 mm,
   iii) a pizza blister Hunter L scale colour value of less than 50,
   iv) a melt value of equal to or less than 6 on the modified Schreiber melt test,
   v) a free oil content of less than 20% cheese mass,
   vi) a stretch of less than 50 cm, or
   vii) any combination of two or more of (i) to (vi) above.

6. A process for making a pasta filata cheese comprising
   a) providing a source of milk protein comprising
      i) at least 65 to 99% casein, and
      ii) a total divalent cation content of about 25 to about 75 mMol of divalent cations/100 g casein, and
      iii) a total monovalent cation content of about 100 to about 250 mMol monovalent cations/100 g casein, and
      iv) a total cation content of about 150 to about 300 mMol total cations/100 g casein, and
      v) a pH of from about 4.9 to about 6,
   b) contacting the source of milk protein with a coagulating agent at a temperature of 8-50° C. to produce a milk curd,
   c) mixing at least one lipid ingredient and the curd to produce a mixture,
   d) heating and mechanically working the mixture at a temperature of from about 65 to about 90° C. to produce a heated cheese mass, and
   e) processing the heated cheese mass to form a pasta filata cheese product.

7. A process for making a pasta filata cheese comprising
   a) providing a source of milk protein comprising
      i) at least 65 to 99% by weight casein, and
      ii) a total divalent cation content of about 25 to about 75 mMol of divalent cations/100 g casein, and
      iii) a pH of from about 4.9 to about 6,
   b) contacting the source of milk protein with a coagulating agent at a temperature of 8 to 50° C. to produce a milk curd,
   c) mixing at least one lipid ingredient and the curd to produce a mixture and adjusting the monovalent cation content to obtain
      i) a total monovalent cation content of about 100 to about 250 mMol monovalent cations/100 g casein, and
      ii) a total cation content of about 150 to about 300 mMol total cations/100 g casein, and
   d) heating and mechanically working the mixture at a temperature from about 65 to about 90° C. to produce a heated cheese mass, and
   e) processing the heated cheese mass to form a pasta filata cheese product.

8. A process of claim 6 wherein the source of milk protein is selected from whole milk, skim milk, milk protein concentrate, milk protein isolate, whey protein concentrate, whey protein isolate or any combination of any two or more thereof.

9. A process of claim 6 wherein the mineral content of the source of milk protein is adjusted by filtration, acid addition, or sequestration or a combination thereof.

10. A process of claim 9 wherein the filtration comprises subjecting the source of milk protein to at least one filtration step to produce a protein retentate.

11. A process of claim 10 comprising contacting the retentate with a cation ion exchange resin, the counter ions in the resin comprising sodium, potassium or sodium and potassium, to replace at least about 15 to about 30% of the divalent cations in the retentate with sodium, potassium or sodium and potassium.

12. A process of claim 11 wherein the retentate is mixed with a further source of milk protein.

13. A process of claim 10 wherein the retentate is subjected to filtration comprising ultrafiltration or microfiltration or both, using a diafiltration medium consisting of water supplemented with added potassium and/or sodium ions to produce a mineral adjusted retentate.

14. A process of claim 6 wherein the monovalent cations are adjusted in the curd, the mixture, the cheese mass, or a combination thereof.

15. A process of claim 14 wherein the monovalent cations are adjusted through removal or one or more monovalent cations or the addition of one or more monovalent cations.

16. A process of claim 15 wherein the monovalent cations are adjusted through the addition of NaCl or KCl.

17. A process of claim 6 wherein the sodium content in the curd, the mixture, or the curd and the mixture is adjusted to about 100 to about 250 mMol Na/100 g Casein.

18. A process of claim 6 wherein the milk protein is acidified through the addition of a food grade acid.

19. A process of claim 6 wherein the milk protein is subjected to fermenting acidification through the addition of lactic acid starter bacteria.

20. A process of claim 6 wherein the milk curd is ground.

21. A process of claim 6 wherein the heated cheese mass is stretched in a mozzarella or pasta filata kneader/stretcher device.

22. A process of claim 6 wherein the heated cheese mass is shaped and cooled.

23. A process of claim 6 wherein the heated cheese mass is placed onto a casting device, which cools the cheese to form a continuous sheet or ribbon.

24. A process of claim 23 wherein the cast cheese is shredded to produce individual shredded cheese particles.

25. A process of claim 6 wherein the heated cheese mass is placed into a low temperature extruder to extrude and cut the cheese mass to form shreds and the shreds are immediately placed into a freezer.

\* \* \* \* \*